US008636454B2

(12) United States Patent
Okada et al.

(10) Patent No.: US 8,636,454 B2
(45) Date of Patent: Jan. 28, 2014

(54) FASTENER

(75) Inventors: Shigeo Okada, Kanagawa (JP); Takeshi Nakajima, Kanagawa (JP); Kouichi Kato, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 386 days.

(21) Appl. No.: 13/054,761

(22) PCT Filed: May 7, 2009

(86) PCT No.: PCT/JP2009/058623
§ 371 (c)(1),
(2), (4) Date: Jan. 18, 2011

(87) PCT Pub. No.: WO2010/007828
PCT Pub. Date: Jan. 21, 2010

(65) Prior Publication Data
US 2011/0116890 A1    May 19, 2011

(30) Foreign Application Priority Data
Jul. 18, 2008 (JP) .............................. P. 2008-186919

(51) Int. Cl.
F16B 13/06 (2006.01)
(52) U.S. Cl.
USPC ............................................. 411/45; 24/295
(58) Field of Classification Search
USPC ................... 411/45, 48; 24/297, 295
See application file for complete search history.

(56) References Cited

U.S. PATENT DOCUMENTS 4,630,338 A * 12/1986 Osterland et al. ................ 24/293
4,865,505 A * 9/1989 Okada ............................ 411/512
5,100,273 A * 3/1992 Vassiliou ....................... 411/80.1

(Continued)

FOREIGN PATENT DOCUMENTS

| JP | 62-170410 U | 10/1987 |
| JP | 10-9237 A | 1/1998 |
| JP | 2002-227814 A | 8/2002 |
| JP | 2007-315467 A | 12/2007 |

*Primary Examiner* — Gary Estremsky
(74) *Attorney, Agent, or Firm* — McGinn IP Law Group, PLLC

(57) ABSTRACT

There is provided a fastener which can be brought into firm engagement with a mounting hole without being affected by a change in thickness of a member in which the mounting hole is provided or a larger or smaller inside diameter of the mounting hole. This fastener 1 includes a pin 10, a metal plate spring member 30 and a grommet 50. The plate spring member 30 has a base portion 31 and a pair of elastic engagement pieces 35, 35 which are opened in their free state and which are closed when pressed against their elastic restoring force. The elastic engagement pieces 35 have engagement shoulder portions 37 which are brought into engagement with the mounting hole, and distal ends thereof are folded to constitute folded portions 40. The folded portions 40 are offset widthwise from each other, and engagement projecting pieces 43 are formed on inner sides thereof. Abutment pieces 45 are formed on the folded portions 40 in positions lying closer to the base portion 31 with which a distal end portion 15 of the pin 10 is brought into abutment to impart a driving force thereto. Abutment portions 45a are formed on the abutment pieces 45 which convert the driving force applied along an inserting direction of the pin 10 into a driving force applied widthwise outwards of the abutment pieces 45.

20 Claims, 18 Drawing Sheets

(56) References Cited

U.S. PATENT DOCUMENTS

| | | | |
|---|---|---|---|
| 5,261,772 A * | 11/1993 | Henninger et al. | 411/46 |
| 5,636,891 A * | 6/1997 | Van Order et al. | 296/37.7 |
| 6,976,292 B2 * | 12/2005 | MacPherson et al. | 24/293 |
| 7,178,850 B2 * | 2/2007 | Smith et al. | 296/29 |
| 7,207,758 B2 * | 4/2007 | Leon et al. | 411/45 |
| 7,374,200 B2 * | 5/2008 | Ikeda et al. | 280/728.2 |
| 2006/0032029 A1 * | 2/2006 | Nessel et al. | 24/289 |

* cited by examiner

FASTENER

TECHNICAL FIELD

The present invention relates to a fastener, for example, which is inserted into a mounting hole formed in a body panel of a motor vehicle to be fixed therein.

BACKGROUND ART

For example, a fastener is used in mounting a mounting-subject member such as a trim board on a mount-base member such as a body panel of a motor vehicle.

As a conventional fastener of this type, Patent Document 1 discloses a clip including a synthetic-resin pin, a metal plate spring member which receives the pin to fix a mounting-subject member to a mount-base member securely and a synthetic-resin grommet. The plate spring member is made up of a receiving portion having a through hole for the pin and a pair of leg portions. The pair of leg portions are folded back inwards at ends thereof so as to be expanded in accordance with an insertion of the pin between the leg portions. The grommet has a main body portion, which accommodates the plate spring member. At an upper end of the main body portion, an expandable portion, which is configured to follow an expansion of the leg portions, is formed.

Then, the pair of leg portions of the plate spring member are expanded by inserting the pin through the through hole in the plate spring member, inserting the clip through mounting holes formed in the mounting-subject member and the mount-base member with the plate spring member fitted in the main body portion of the grommet, and press fitting the pin. Then, the expandable portion of the main body portion of the grommet is expanded to be brought into engagement with circumferential edges of the mounting holes, whereby both the members are fixedly held together via the clip.

RELATED ART DOCUMENT

Patent Document

Patent Document 1: JP-H10-009237-A

SUMMARY OF THE INVENTION

Problem to be Solved by the Invention

In the clip of Patent Document 1, since the pair of leg portions of the spring member are expanded by pushing in the pin, the leg portions of the spring member cannot be expanded wider than an outside diameter of the pin, and an expandable width of the pair of leg portions is constant. As a result, an expandable width of the expandable portion of the grommet which is expanded by the pair of leg portions is also constant.

Because of this, in case the thickness of the mounting-subject member such as a trim board is reduced with time in a fixed state using the clip, a gap may be produced between the circumferential surfaces of the mounting holes and the clip, and the clip may be loosened.

In addition, in the clip, since the expandable width of the expandable portion of the grommet is determined by the outside diameter of the pin, in case the inside diameter of the mounting hole is larger than its standard size or the thickness of the mounting-subject member is thinner than its standard thickness due to dimensional errors, for example, the clip may be loosened relative to the mounting hole.

Consequently, an object of the invention is to provide a fastener which can be brought into secure engagement with a mounting hole without being affected by a change in thickness of a member in which the mounting hole is provided or irregularity in inside diameter of the mounting hole.

Means for Solving the Problem

With a view to attaining the object, the invention provides a fastener having a pin and a metal plate spring member which receives the pin and adapted to be fixed in a mounting hole, wherein the plate spring member has a base portion adapted to be brought into an engagement with a front side of the mounting hole and having an insertion hole through which the pin is inserted and a pair of elastic engagement pieces engageable with each other by being pressed against their elastic restoring force to be closed, the pair of elastic engagement pieces having engagement shoulder portions formed at axially intermediate positions thereof to engage with a circumferential edge of a back side of the mounting hole with the elastic restoring force when expanded and to pass through the mounting hole when contracted, and the pin has a head portion and a shaft portion extended from the head portion, the shaft portion releasing an engagement of the pair of elastic engagement pieces to allow them to be expanded by being inserted into between the pair of elastic engagement pieces in a closed state and restricting the pair of elastic engagement pieces from contracting inwards by being disposed between the pair of engagement pieces in an opened state.

In the invention, preferably, respective distal ends of the pair of elastic engagement pieces are folded inwards to constitute folded portions, the folded portions are offset widthwise from each other, and an engagement projecting piece is formed on one or both inner sides of the folded portions which are adjacent widthwise to each other, whereby when the elastic engagement pieces are closed, one of the engagement projecting pieces is brought into engagement with the other inner side or the other engagement projecting piece so as to hold the elastic engagement pieces in the closed state. Preferably, abutment pieces are formed on the folded portions in positions lying closer to proximal portions thereof than the engagement projecting pieces with which a distal end portion of the pin is brought into abutment to thereby apply a driving force thereto when the pin is inserted with the elastic engagement pieces in the closed state, and abutment portions are formed individually on the abutment pieces which convert the driving force exerted in the inserting direction of the pin into a driving force exerted widthwise outwards of the abutment pieces, whereby when inserted between the elastic engagement pieces in the closed state, the shaft portion of the pin is brought into abutment with the abutment pieces at a distal end portion thereof.

In the invention, preferably, the respective abutment pieces of the folded portions are folded so that distal end portions thereof approach back surface sides of the elastic engagement pieces. Preferably, Inner sides of the abutment pieces which lie adjacent widthwise to each other are caused to slope widthwise outwards so that the inner sides extend apart from each other towards distal ends thereof, the sloping inner sides constituting the abutment portions, and the distal end portion of the shaft portion of the pin has a tapered shape to be brought into abutment with the sloping inner sides of the abutment pieces when the pin is driven.

In the invention, preferably, a constricted portion is formed in the shaft portion of the pin in which the folded portions of the plate spring member fit when the pin is driven until the head portion of the pin is brought into engagement with a circumferential edge of the insertion hole in the plate spring member.

In the invention, preferably, in the base portion of the plate spring member, a pair of narrow portions are formed on an outer circumference of the insertion hole between the pair of elastic engagement pieces to face each other, so that the base portion is bendable at the pair of narrow portions to deflect the pair of elastic engagement pieces.

In the invention, preferably, the narrow portions formed in the base portion of the plate spring member are disposed at both side portions of the base portion which lie at right angles to the deflecting direction of the pair of elastic engagement pieces in positions which lie eccentric towards widthwise portions of the elastic engagement pieces where the folded portions are not formed when the base portion is viewed in an axial direction.

In the invention, preferably, expanded portions are formed on the shaft portion of the pin which are brought into abutment with portions of the pair of elastic engagement pieces which lie closer to proximal portions than the engagement shoulder portions but are not brought into abutment with portions which lie closer to distal ends than the engagement shoulder portions when the shaft portion of the pin is disposed between the pair of elastic engagement pieces.

In the invention, preferably, the fastener further has a grommet in addition to the pin and the plate spring member, and the grommet has a base portion adapted to be brought into engagement with a circumferential edge of the front side of the mounting hole and a leg portion which extends from a back surface side of the base portion, an insertion opening is provided in the base portion through which the pair of elastic engagement pieces of the plate spring member and the shaft portion of the pin are inserted, a holding unit is provided between the base portion and the shaft portion of the pin which temporarily holds the pin which is inserted into the plate spring member through the insertion hole in a position where no driving force is applied to the abutment pieces, and disengagement prevention claws are provided on the pair of elastic engagement pieces of the plate spring member in positions which lie closer to the proximal portions than the engagement shoulder portions which are brought into engagement with a circumferential edge of a back side of the insertion opening in the base portion, whereby by the disengagement prevention claws being brought into engagement with the circumferential edge of the back side of the insertion opening in the base portion, the plate spring member is held in the grommet, and the pin is temporarily held in the grommet by the holding unit in that state.

In the invention, preferably, provided on the shaft portion of the pin are a temporary holding portion which temporarily holds the pin in the grommet in a position where no driving force is applied to the abutment pieces of the plate spring member and a fixing portion which fixed the pin in the grommet when the pin is driven until the head portion thereof is brought into engagement with the circumferential edge of the insertion hole in the plate spring member.

In an aspect of the invention, preferably, the leg portion of the grommet has a pair of leg portions which are disposed in a direction which is at right angles to the deflecting direction of the pair of elastic engagement pieces of the plate spring member held in the grommet.

In another aspect of the invention, preferably, the leg portion of the grommet has a pair of leg portions which are disposed in the deflecting direction of the pair of elastic engagement pieces and outside of the pair of elastic engagement pieces.

In the other aspect of the invention, more preferably, the pair of leg portions of the grommet are connected together at distal ends thereof and tapered towards the distal ends.

In the other aspect of the invention, preferably, a guide leg portion having a engagement groove extending along an axial direction is formed in a position lying at right angles to the pair of leg portions, and a pair of projecting portions are formed on the shaft portion of the pin which are brought into engagement with an inner circumference of the engagement groove at both end portions when the pin is driven until the head portion of the pin is brought into engagement with the circumferential edge of the insertion hole in the plate spring member.

Advantage of the Invention

According to the invention, by pressing the pair of elastic engagement pieces which are opened in their free state so as to be closed inwards against their elastic restoring force and bringing them into engagement with each other in that state, the engagement shoulder portions are prevented from being caught at the mounting hole or the elastic engagement pieces are prevented from being pressed strongly against the inner circumference of the mounting hole when the engagement shoulder portions pass through the mounting hole, whereby the inserting resistance is reduced, enabling the plate spring member to be inserted into the mounting hole smoothly.

Then, after the pair of elastic engagement pieces are inserted into the mounting hole and the base portion of the plate spring member is brought into engagement with the front side of the mounting hole, the shaft portion of the pin which is inserted from the insertion hole in the base portion is driven thereinto, whereby the engagement of the elastic engagement pieces is released, and the elastic engagement pieces are expanded by their elastic restoring force, and the engagement shoulder portions are then brought into engagement with the circumferential edge of the back side of the mounting hole, whereby the fastener can be fixed in the mounting hole.

As this occurs, since the elastic engagement pieces of the plate spring member are brought into engagement with the circumferential edge of the back side of the mounting hole with the elastic restoring force, even in the event that the thickness of the member in which the mounting hole is formed changes or the inside diameter of the mounting hole is larger or smaller than its standard dimension, the pair of elastic engagement pieces are expanded or contracted diametrically so as to keep the engagement shoulder portions in engagement with the circumferential edge of the back side of the mounting portions, thereby mounting the fastener in the mounting hole without any looseness.

BRIEF DESCRIPTION OF THE DRAWINGS

FIGS. 10A to 10C Diagrams showing steps of releasing an engagement of the elastic engagement pieces of the plate spring member are shown, of which FIG. 10A is an explanatory diagram showing a first step, FIG. 10B is an explanatory diagram showing a second step, and FIG. 10C is an explanatory diagram showing a third step.

MODE FOR CARRYING OUT THE INVENTION

Figure 1:
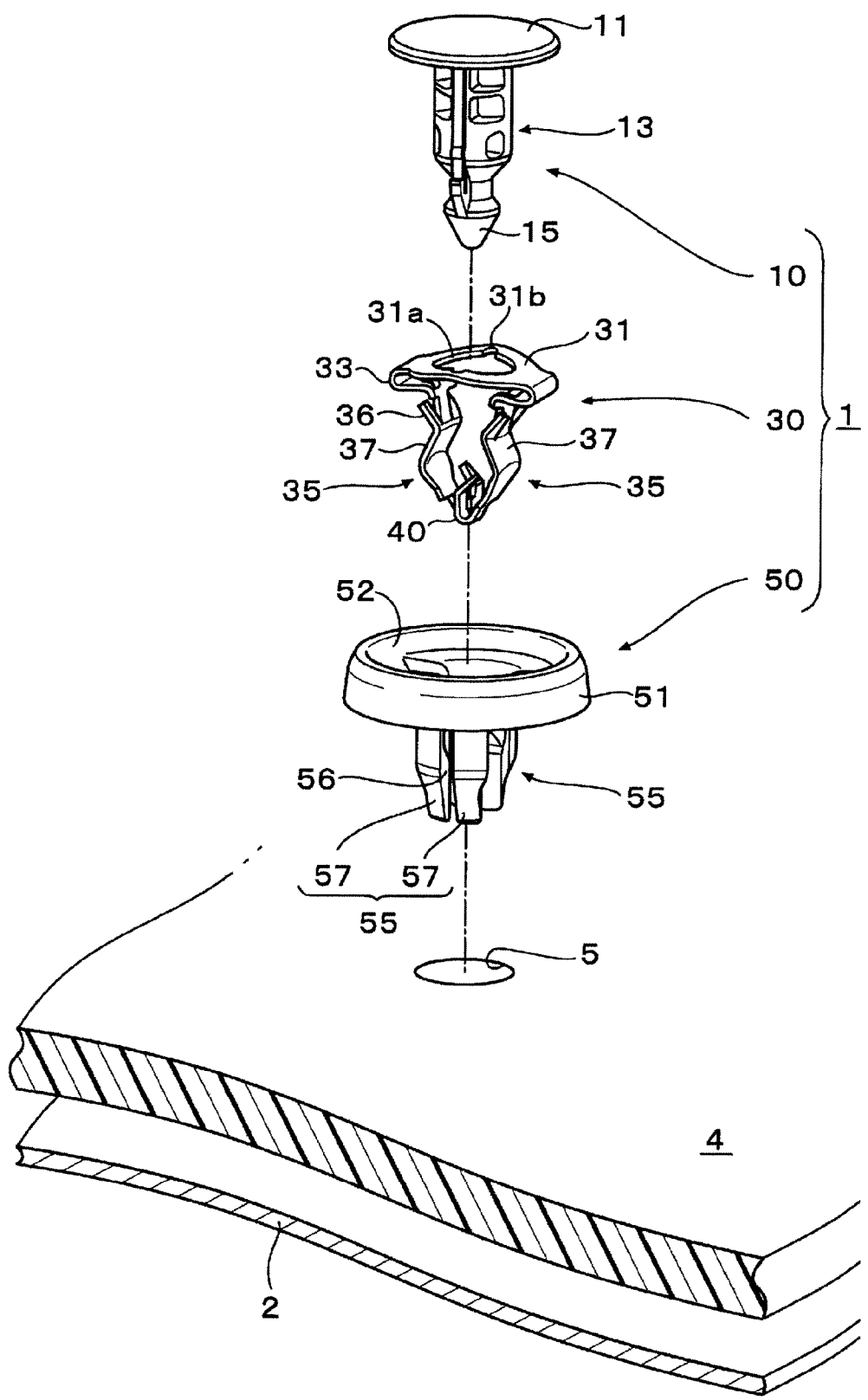
FIG. 1 A perspective view showing an embodiment of a fastener of the invention.
Figure 8A:
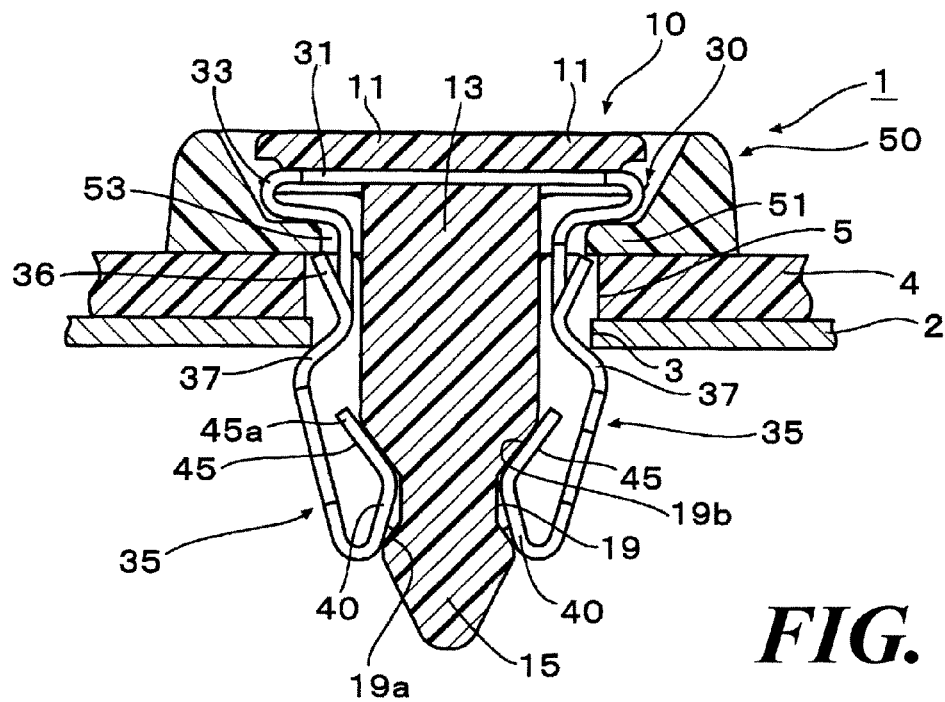
FIG. 8A is an explanatory diagram showing a state in which the fastener is fixed in the mounting holes with the other members than the plate spring member shown in section.
Figure 8B:
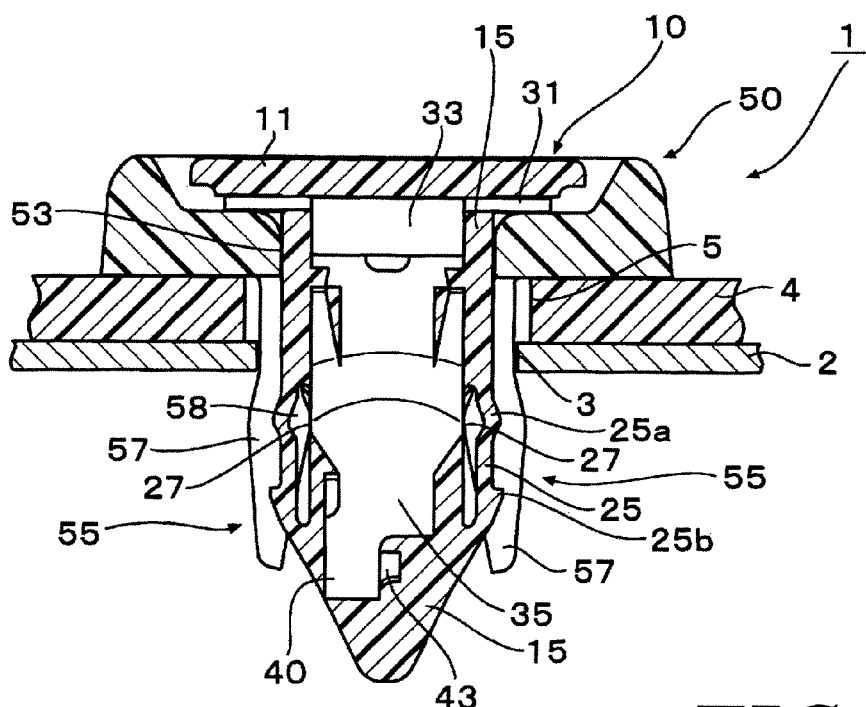
FIG. 8B is an explanatory diagram showing the same state as viewed in a different direction from FIG. 8A.

Hereinafter, an embodiment of a fastener according to the invention will be described by reference to the drawings. As shown in FIGS. 1, 8A and 8B, this fastener 1 is used, for example, to mount a mounting-subject member 4 such as a trim board on a mount-base member 2 such as a body panel via the fastener 1 by being inserted and fixed in a mounting hole 3 formed in the mount-base member 2.

As shown in FIG. 1, the fastener 1 in this embodiment has a pin 10, a metal plate spring member 30 which receives the pin 10 and a grommet 50 which holds both the pin 10 and the plate spring member 30.

Firstly, referring to FIGS. 2A to 3C and 6 to 10C, the plate spring member 30 will be described. This plate spring member 30 is formed of a single metal plate and has a base portion 31 and a pair of elastic engagement pieces 35, 35 which extend from the base portion 31 and which are left open in their free state and are closed when pressed against their elastic restoring force to be brought into engagement with each other.

Figure 2B:
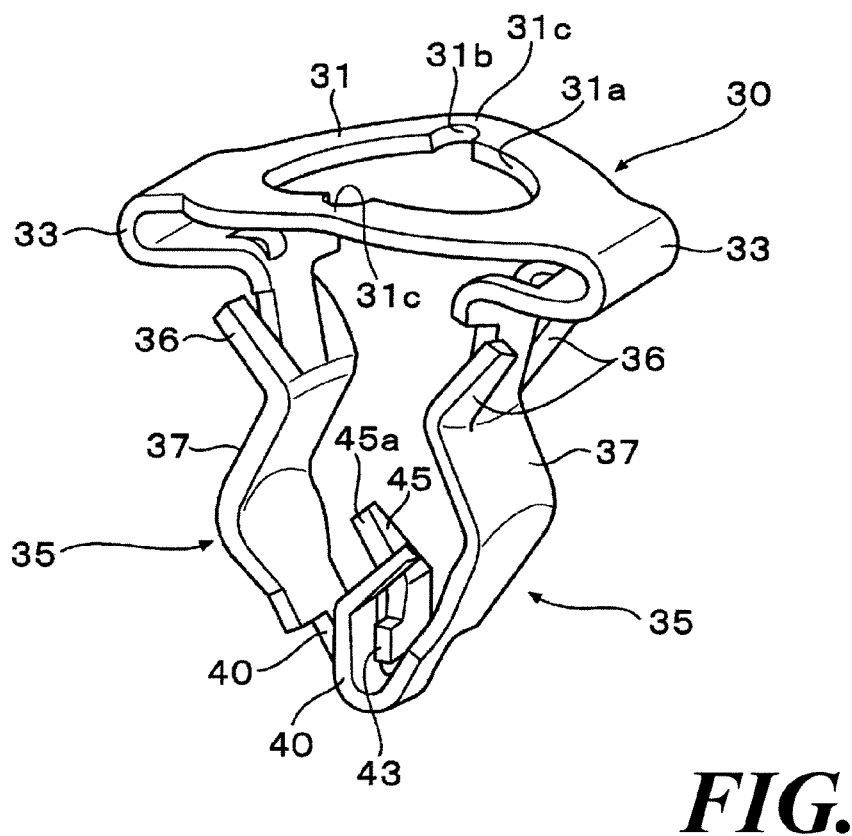
FIG. 2B is a perspective view showing a state in which the elastic engagement pieces of the same plate spring member are closed.
Figure 3A:
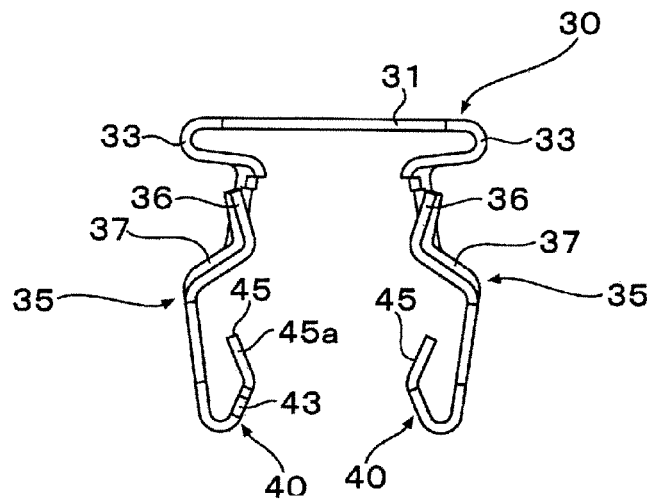
FIG. 3A is a front view of the plate spring member.
Figure 3B:
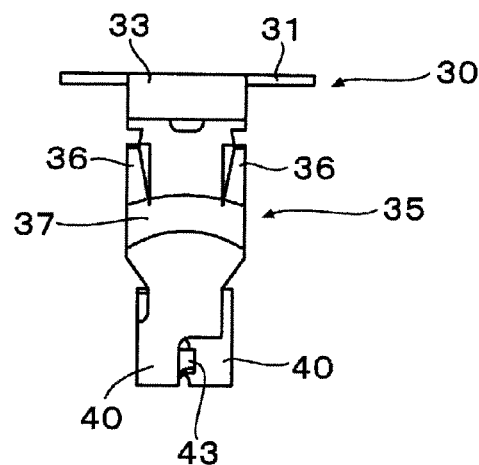
FIG. 3B is a side view.
Figure 3C:
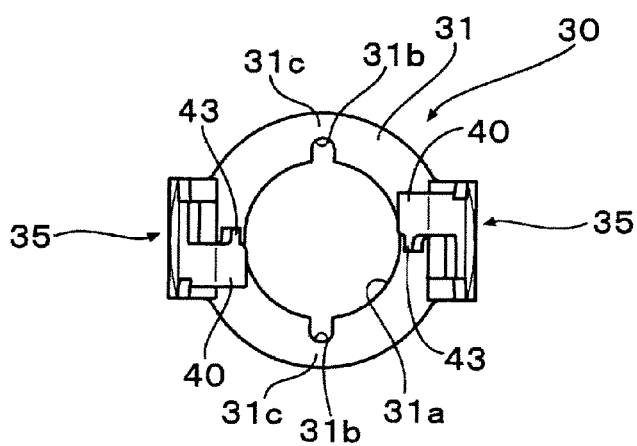
FIG. 3C is a bottom view.

As shown in FIG. 3C, the base portion 31 has a circular shape as a whole, and a circular insertion hole 31a is formed in a center thereof for the pin 10 to be inserted therethrough. A pair of notches 31b, 31b are formed in an inner circumference of the insertion hole 31a in positions which intersect the pair of elastic engagement pieces 35, 35 at right angles. A pair of narrow portions 31c, 31c are formed in facing positions on an outer circumference of the insertion hole 31a in the base portion 31 by the notches 31b, whereby the base portion 31 is bendable at the pair of narrow portions 31c, 31c to deflect the pair of elastic engagement pieces 35, 35 (refer to FIG. 2B).

Strip-shaped pieces of a predetermined width protrude from both side portions of the base portion 31 which lie at right angles to the notches 31b, 31b, and these strip-shaped pieces are then folded back inwards, so as to form bent portions 33, 33 which are each bent into a substantially U-shape as viewed from side. Respective proximal end portions of the elastic engagement pieces 35 are connected to the bent portions 33, 33. The U-shaped bent portions 33 function to increase the elastic restoring force of the elastic engagement pieces 35, 35 which are connected thereto.

The proximal end portions of the pair of elastic engagement pieces 35, 35 extend from the U-shaped bent portions 33 so as to rise at a predetermined angle with respect to the base portion 31, and disengagement prevention claws 36, 36 are cut to rise outwards in both widthwise sides of the proximal end portions. The disengagement prevention claws 36, 36 are brought into engagement with a circumferential edge of a back side of an insertion opening 53 in the grommet 50, which will be described later, so as to prevent the disengagement of the plate spring member 30 (refer to FIGS. 7A to 9B).

Axially intermediate portions of both the elastic engagement portions 35, 35 are bent obliquely outwards so as to be spaced away from each other to thereby constitute engagement shoulder portions 37 which are brought into engagement with a circumferential edge of a back side of the mounting hole 3 when the elastic engagement pieces 35, 35 are opened and which pass through the mounting hole 3 when the elastic engagement pieces 35, 35 are closed. The engagement shoulder portion 37 has a circular arc shape with a convexly curved surface oriented radially outwards so as to match the circular mounting hole 3 (refer to FIGS. 2A, 2B, 3B, 3C).

Respective distal end portions of the elastic engagement pieces 35, 35 are folded inwards so as to constitute folded portions 40, 40, and further, as shown in FIGS. 3B, 3C, the folded portions 40, 40 are formed so as to be offset from each other in a width direction thereof, so that both the folded portions 40, 40 are prevented from interfering with each other when the pair of elastic engagement pieces 35, 35 are made to approach each other to thereby be closed.

Engagement projecting pieces 43, 43 are provided on inner sides of the folded portions 40 which lie adjacent to each other in the width direction so as to project towards the other adjacent folded portion 40. Each engagement projecting piece 43 is formed in a position where it is superposed on the other engagement projecting piece 43 when the elastic engagement pieces 35, 35 are closed. Then, when the elastic engagement pieces 35, 35 are closed, as shown in FIG. 2B, the engagement projecting pieces 43, 43 are brought into engagement with each other so as to hold the elastic engagement pieces 35, 35 in the closed state.

Note that the engagement projecting piece 43 may be formed only on one of the folded portions 40. In this case, when the elastic engagement pieces 35, 35 are closed, the engagement projecting piece 43 on the one folded portion 40 is brought into engagement with a back surface of the inner side of the other folded portion 40 (an opposite side to a facing surface of the one folded portion 40), whereby the elastic engagement pieces 35, 35 are closed.

An abutment portion 45 is formed on each folded portion 40 at a portion thereof which extends further towards the base portion 31 than the engagement projecting piece 43 (at distal end portion of the folded portion 40) to receive a driving force from a distal end portion 15 (which will be described later) of the pin 10 through an abutment therewith when the pin 10 is inserted while the elastic engagement pieces 35, 35 are closed. In the case of this embodiment, the abutment piece 45 is formed to be bent into a "collapsed V-shape" as viewed from a side thereof so that a distal end portion of the folded portion 40 is directed towards a back surface of the elastic engagement piece 35 from which the folded portion 40 extends.

An abutment portion is formed on each abutment piece 45 which changes the direction of the driving force from the inserting direction of the pin 10 to a widthwise outward direction of the abutment piece 45. In this embodiment, the inner sides of the abutment pieces 45 which lie adjacent widthwise to each other are each made into a sloping inner side which extends widthwise outwards while gradually sloping towards the base portion 31 of the plate spring member 30, and this sloping inner side constitutes the abutment portion 45a (refer to FIGS. 2A and 2B and 10A to 10C). These abutment portions 45a, 45a are designed to be brought into abutment with an outer circumferential surface of the conical-shaped distal end portion 15 of the pin 10 while the elastic engagement pieces 35, 35 are closed (refer to FIG. 6).

Figure 6:
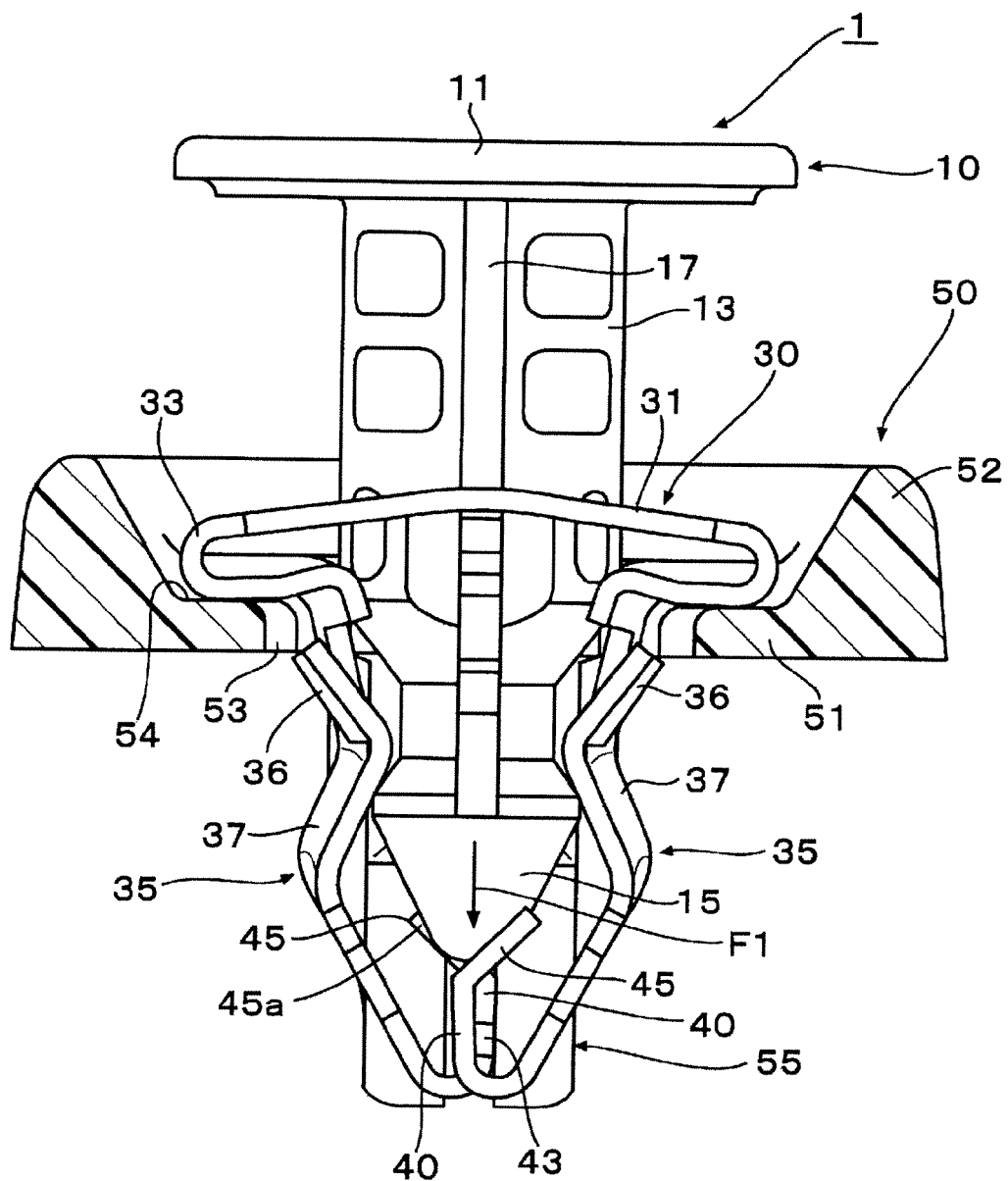
FIG. 6 An explanatory diagram of a state in which the plate spring member with the elastic engagement pieces closed and the pin are assembled into the grommet.

Next, referring to FIGS. 4A to 4C and 6 to 9B, the pin 10, which is received in the above-described plate spring member 30, will be described. This pin 10 has a circular head portion 11 and a shaft portion 13 which extends a predetermined length from a center of one surface of the head portion 11, which is inserted into between the elastic engagement pieces 35, 35 which are closed to release the engagement of the elastic engagement pieces 35, 35 and to expand them, and which is then disposed between the elastic engagement pieces 35, 35 which are opened to restrict them from contracting inwards. A distal end portion of this shaft portion 13 has a taper shape so as to be brought into abutment with the sloping inner sides of the abutment pieces 45 when the pin is driven into the plate spring member 30. The shaft portion 13 of this embodiment has a substantially cylindrical shape and the distal end portion 15 thereof has a substantially conical shape. Then, as shown in FIG. 6, the distal end portion 15 of the shaft portion 13 is designed to be brought into abutment with the respective abutment portions 45a, which are each formed into a sloping surface, of the abutment pieces 45 of the elastic engagement pieces 35, 35 in a closed state.

Guide ribs 17, 17 of a predetermined height extend along an axial direction at a proximal portion of the shaft portion 13 at two circumferentially-opposed locations. These guide ribs 17, 17 fit individually in slits 56 (which will be described later) in the grommet 50 when the pin 10 is driven into the grommet 50 so as to guide driving of the pin 10. A constricted portion 19 is formed in a position of the shaft portion 13 which lies closer to the proximal portion than the distal end portion 15 in which the folded portions 40 of the plate spring member 30 fit when the pin is driven into the plate spring member 30 until the head portion 11 of the pin 10 is brought into engagement with a circumferential edge of the insertion hole 31a in the plate spring member 30. An inner surface of a distal end portion of the constricted portion 19 is formed into a reversely tapered surface 19a which diametrically gradually expands towards the distal end portion 15, whereas an inner surface of a proximal end portion is formed into a tapered surface 19b which diametrically gradually contracts towards the distal end portion 15.

Plate-shaped pieces 21, 21 are provided on an inner circumferential surface of the constricted portion 19 in positions which are aligned with the guide ribs 17, 17 so as to project therefrom. A deflectable piece 25 is provided to connect to a distal end of the guide rib 17 and a distal end of the plate-shaped piece 21 via a cutout hole 23 so as to bridge them while being allowed to be deflected. An engagement projecting portion 25a is provided at a proximal end portion of the deflectable piece 25, while an engagement claw portion 25b is provided at a distal end portion thereof.

Figure 7A:
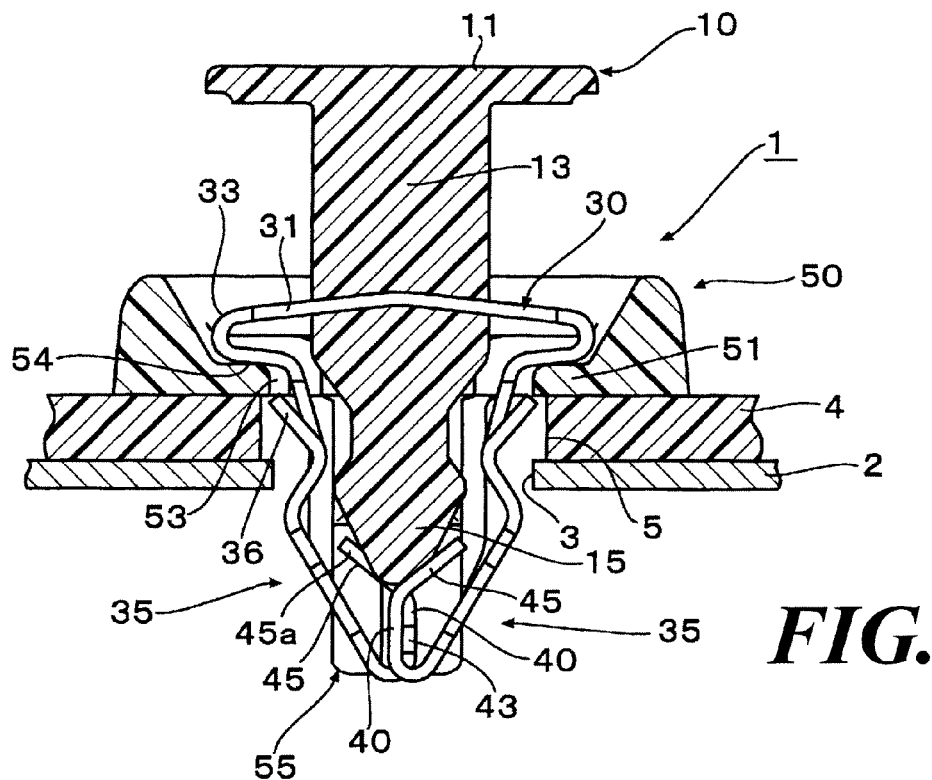
FIG. 7A is an explanatory diagram showing a state in which the fastener is inserted into mounting holes with other members than the plate spring member shown in section.
Figure 7B:
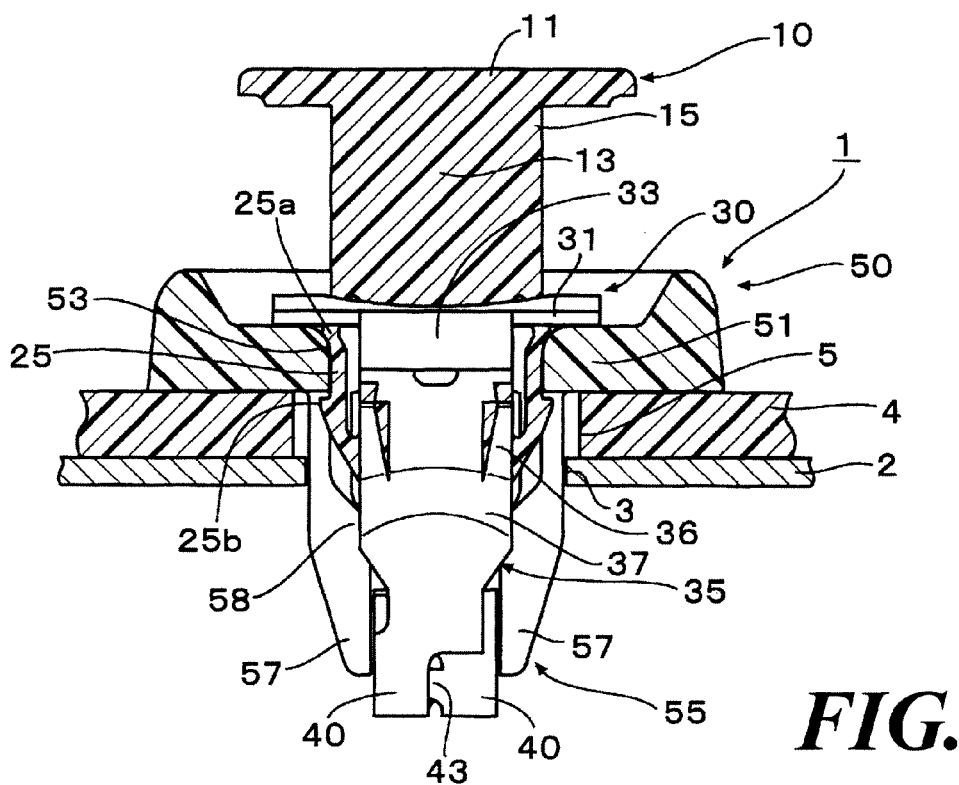
FIG. 7B is an explanatory diagram showing the same state as viewed in a different direction from FIG. 7A.

The engagement projecting portion 25a and the engagement claw portion 25b are disposed so as to be brought into engagement with an upper edge portion and a lower edge portion of a base portion 51 of the grommet 50, respectively, as shown in FIG. 7B, when the pin 10 is driven halfway downwards into the grommet 50 so as to hold the pin 10 securely against while preventing the disengagement of the pin 10 from the grommet 50. As this occurs, the pin 10 is temporarily held in a position where the pin 10 does not apply a driving force to the abutment pieces 45 of the plate spring member 30. Namely, in this embodiment, the engagement projecting piece 25a and the engagement claw portion 25b of the pin 10 and the base portion 51 of the grommet 50 constitute the holding unit of the invention.

Figures 4A, 4B, 4C:
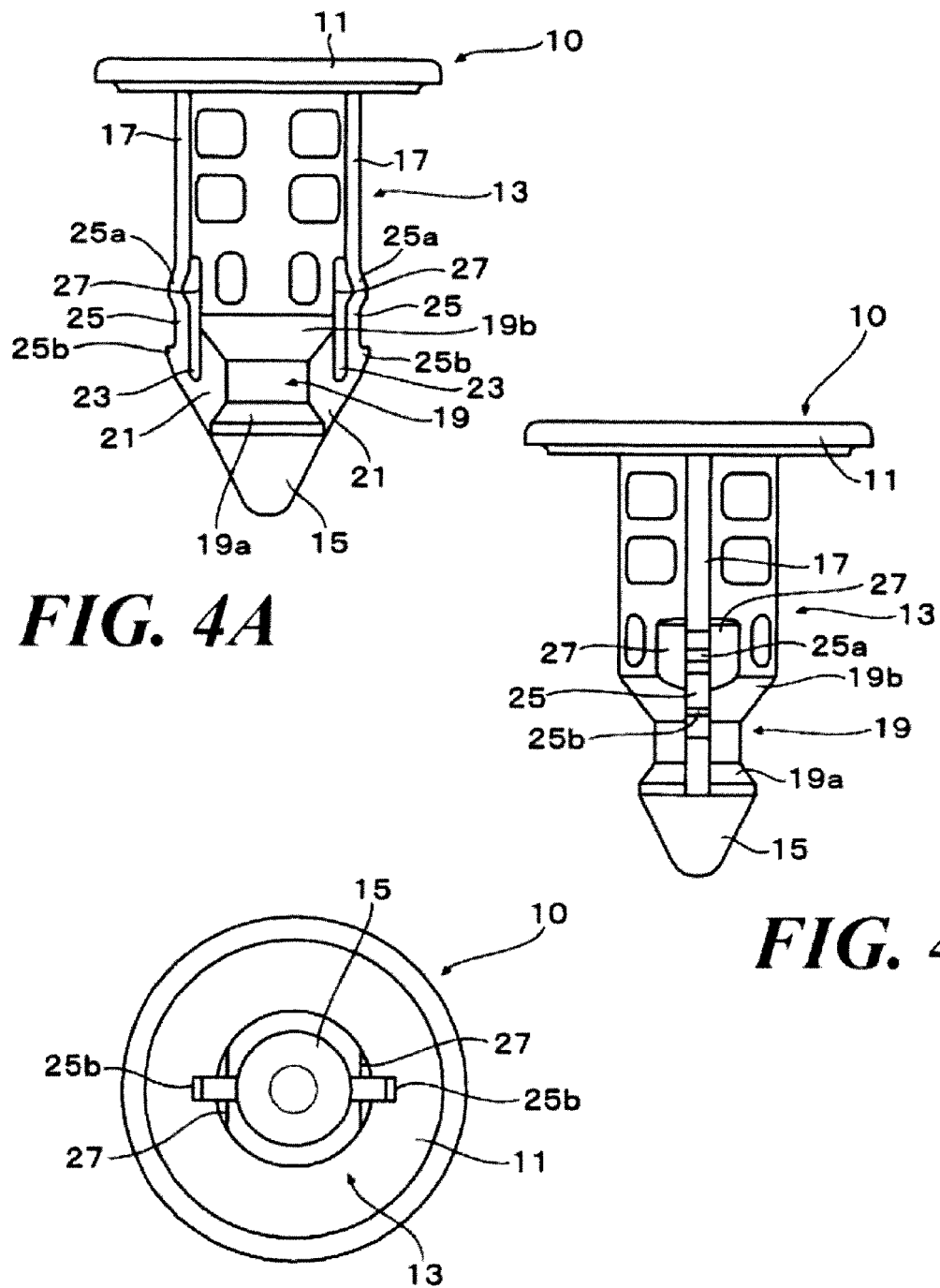
FIG. 4A is a front view of a pin which makes up the fastener.
FIG. 4B is a side view.
FIG. 4C is a bottom view.

Portions on an outer circumferential surface of the shaft portion 13 which face inner surfaces of the deflectable pieces 25 are cut to flat planes which intersect the projecting direction of the guide ribs 17 at right angles to thereby be formed into pressing surfaces 27 (refer to FIGS. 4A to 4C).

Figure 5A:
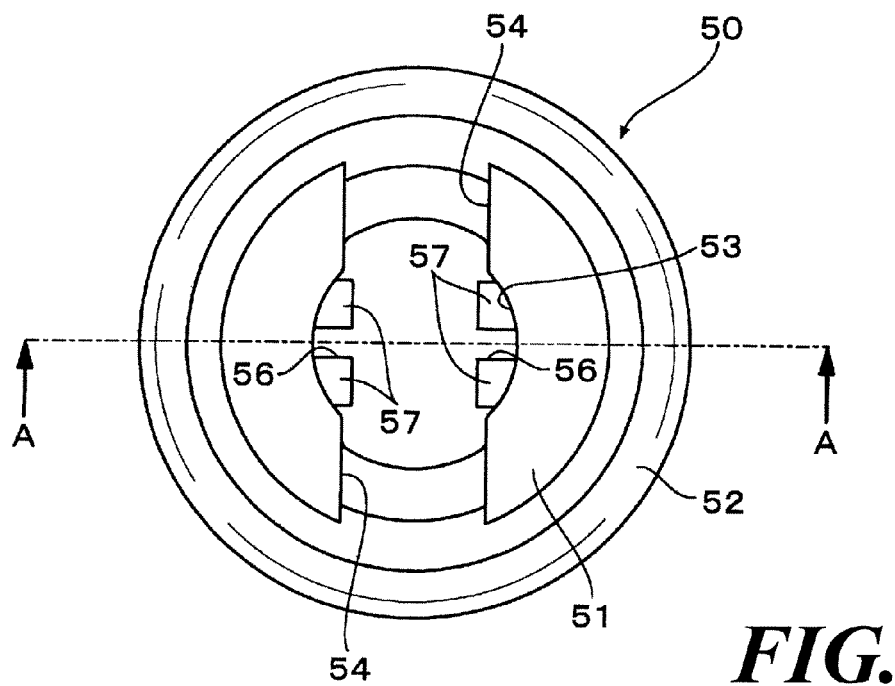
FIG. 5A is a plan view of a grommet which makes up the fastener.
Figure 5B:
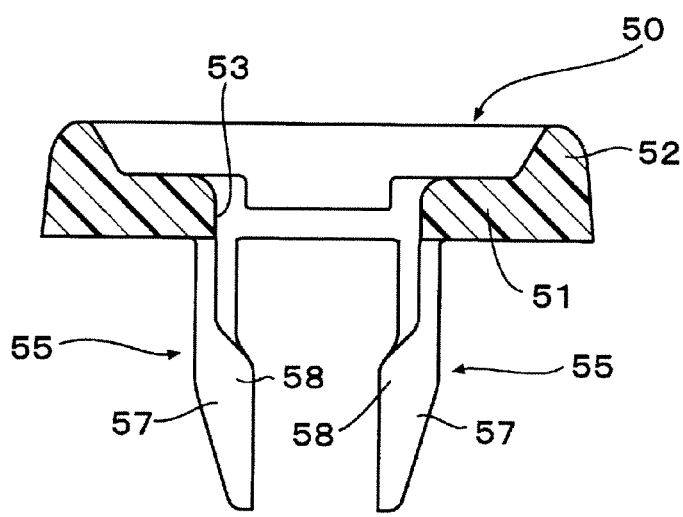
FIG. 5B is a sectional view taken along a line A-A indicated by arrows.

Next, the grommet 50 which holds the pin 10 and the plate spring member 30 will be described by reference to FIGS. 1, 5A, 5B. This grommet 50 has the base portion 51 having a disk shape and a pair of leg portions 55, 55 which extend from a rear surface side of the base portion 51. An annular wall 52 projects from an outer circumference of an upper end of the base portion 51, and a circular insertion opening 53 is formed in a center of the base portion 51 through which the shaft portion 13 of the pin 10 and the elastic engagement pieces 35 of the plate spring member 30 are inserted. Fitting recess portions 54 of a predetermined width are formed in an upper surface of the base portion 51 so as to extend through the center of the insertion opening 53, in which the bent portions 33, 33 of the plate spring member 30 are fitted to thereby prevent the rotation of the plate spring member 30 relative to the grommet 50.

As shown in FIG. 1, the pair of leg portions 55 are disposed in a direction which intersects at right angles the deflecting direction of the pair of elastic engagement pieces 35, 35 of the plate spring member 30 which is held in the grommet 50. A slit 56 is formed in each leg portion 55 so as to extend along the extending direction of the leg portion 55. Each leg portion 55 is made up of guide pieces 57, 57 which result by dividing the leg portion 55 into two via the slit 56. A projecting portion 58 is provided on an inner side of each guide piece 57 so as to project inwards, and an outer circumference of a distal end of the guide piece 57 is shaped so as to be constricted gradually towards the distal end.

Next, a using method of the above-described fastener 1 will be described.

Figure 2A:
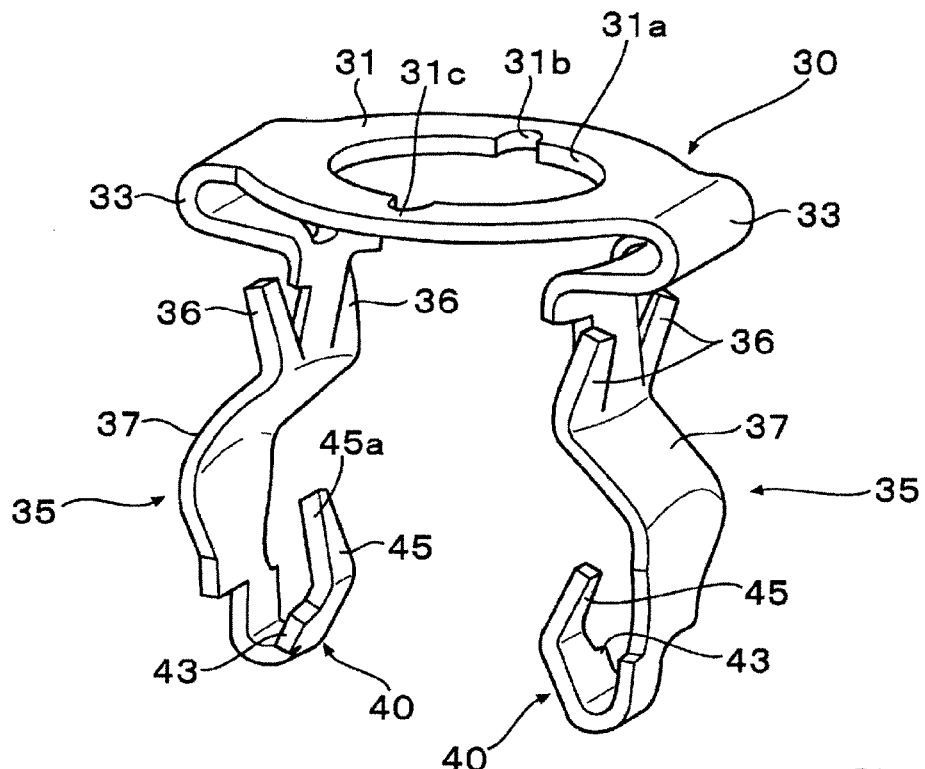
FIG. 2A is a perspective view showing a state in which elastic engagement pieces of a plate spring member which makes up the fastener are opened.

As has been described heretofore, in a free state in which no external force is applied thereto, the pair of elastic guide pieces of the plate spring member 30 which makes up the fastener 1 are spaced away from each other to thereby be opened (refer to FIG. 2A). From this state, the pair of elastic engagement pieces 35, 35 are pressed inwards against their restoring force so that both the elastic engagement pieces 35, 35 are closed.

As this occurs, since the respective engagement projecting pieces 43, 43 of the folded portions 40 are aligned with each other, one engagement projecting piece 43 is brought into engagement with the rear surface side of the other engagement projecting piece 43 (the opposite side to the facing surface of the one engagement projecting piece 43) by causing both the elastic engagement pieces 35, 35 to approach each other while offsetting the folded portions 40, 40 to be spaced away widthwise from each other, whereby the elastic engagement pieces 35, 35 can be held in the closed state (refer to FIG. 2B). When the engagement projecting piece 43 is formed only on one of the folded portions 40, the pair of elastic engagement pieces 35, 35 can be held in the closed state by bringing the engagement projecting piece 43 on the one folded portion 40 into engagement with the rear surface of the inner side of the other folded portion 40 (the opposite side to the facing surface of the one folded portion 40).

In this embodiment, in the base portion 31 of the plate spring member 30, the pair of narrow portions 31c, 31 are formed on the outer circumference of the insertion hole 31a between the pair of elastic projecting pieces 35, 35 to face each other. As a result, since the base portion 31 is bendable at the pair of narrow portions 31c, 31c as shown in FIG. 2B when the elastic engagement pieces 35, 35 are deflected, the elastic engagement pieces 35, 35 are allowed to be deflected easily, whereby not only can the workability in bringing the elastic engagement pieces 35, 35 into engagement with each other be increased, but also a releasing action can be performed smoothly when the engagement between the elastic engagement pieces 35, 35 is released by driving the pin 10 into therebetween.

Next, the bent portions 33, 33 of the plate spring member 30 are aligned with the fitting recess portions 54, 54 of the grommet 50, and the elastic engagement pieces 35, 35 of the plate spring member 30 are driven into the insertion opening 53 in the grommet 50. Then, the elastic engagement pieces 35, 35 in the closed state are inserted between the leg portions 55, 55 of the grommet 50. When the plate spring member 30 is driven into the grommet 50 completely, the U-shaped bent portions 33, 33 fit in the fitting recess portions 54, 54 so as to prevent the rotation of the bent portions 33, 33 relative to the grommet 50, and as shown in FIG. 6, the disengagement prevention claws 36, 36 provided on the elastic engagement piece 35 are brought into engagement with the circumferential edge of the rear surface of the insertion opening 53, whereby the plate spring member 30 is held in the grommet 50.

In this state, when the plate spring member 30 is held in the grommet 50, the pair of leg portions 55, 55 of the grommet 50 are disposed on both the sides of the pair of elastic engagement pieces 35, 35, as a result, since the pin 10 is restricted from moving in the direction which intersects the deflecting direction of the elastic engagement pieces 35 at right angles, the distal end portion 15 of the pin 10 can be surely pressed against the abutment pieces 45, 45 of the plate spring member 30.

Next, the pin 10 is temporarily held in the grommet 50. Namely, the guide ribs 17, 17 of the pin 10 are aligned with the slits 56, 56 of the grommet 50 and the notches 31b, 31b of the plate spring member 30, and the pin is driven halfway downwards into the grommet 50 through the insertion opening 53 in the grommet 50. As a result, the engagement projecting pieces 25a and engagement claw portions 25b are brought into engagement with the upper and lower edge portions of the base portion 51, whereby the pin 10 is held in the grommet 50 while being prevented from being disengaged therefrom (refer to FIG. 7B). As this occurs, as shown in FIGS. 6 and 7A, the distal end portion 15 of the pin 10 holds the elastic engagement pieces 35, 35 in the closed state without applying any driving force to the abutment pieces 45.

In this embodiment, as described above, by driving the elastic engagement pieces 35, 35 in the closed state through the insertion opening 53 in the grommet 50, the plate spring member 30 can be held in the grommet 50 while being prevented from being disengaged therefrom, and by driving the pin 10 into the plate spring member 30 and the grommet 50 through the insertion hole 31a in the plate spring member 10 and the insertion opening 53 in the grommet 50, the pin 10 can be held in the grommet 50 in the position where the elastic engagement pieces 35 are not opened by the holding unit (the engagement projecting portions 25a and the engagement claw portions 25b of the pin 10 and the base portion 51 of the grommet 50). In this way, since the fastener 1 includes not only the pin 10 and the plate spring member 30 but also the grommet 50 which holds both the pin 10 and the plate spring member 30, the plate spring member 30 and the pin 10 can be assembled together in advance, thereby enhancing the workability in fixing the fastener 1 in the mounting hole 3.

Then, a mounting hole 5 in the mounting-subject member 4 is aligned with the mounting hole 3 in the mount-base member 2 (refer to (FIGS. 7A and 7B), and a distal end portion of the assembled fastener 1 is inserted from the mounting hole 5. Then, the base portion 51 of the grommet 50 is brought into abutment with a circumferential edge of a front side of the mounting hole 5, and the distal end portions of the elastic engagement pieces 35 of the plate spring member 30 and the leg portions 55 of the grommet 50 are caused to project from the mounting hole 3.

In this embodiment, since the pair of leg portions 55, 55 of the grommet 50 constitute insertion guides when the fastener 1 is inserted into the mounting hole 5 and the mounting hole 3, the insertion capability of the fastener 1 can be enhanced. Further, since each leg portion 55 is made up of the guide pieces 57, 57 which result from dividing the leg portion into two and is hence highly flexible, the insertion resistance can be reduced while maintaining the guiding performance of the fastener 1.

In this embodiment, by closing the pair of elastic engagement pieces 35, 35 which are left open in their free state against their elastic restoring force and bring the elastic engagement pieces 35, 35 into engagement with each other in the closed state, the engagement shoulder portions 37 are prevented from being caught by the mounting hole 3 when the engagement shoulder portions pass through the mounting hole 3, and the elastic engagement pieces 35 are prevented from being driven through the mounting hole 3 while being pressed strongly against the inner circumference of the mounting hole, whereby the fastener 1 can be inserted through the mounting hole 1 smoothly while reducing the insertion resistance.

Then, the pin 10 is driven into the plate spring member 30 to open the pair of elastic engagement pieces 35, 35 in the closed state. In this embodiment, since the respective abutment portions 45a of the abutment pieces 45 are each formed into the sloping surface and the distal end portion 15 of the shaft portion 13 of the pin 10 is formed into the conical shape, when the pin 10 is driven into the plate spring member 30, the conical distal end portion 15 of the pin 10 is brought into abutment with the abutment portions 45a of the abutment pieces 45 which constitute the inner sides thereof, whereby the pin 10 is driven into the plate spring member 30 while the abutment portions 45a of the abutment pieces 45 and the conical surface of the distal end portion 15 of the pin 10 are brought into sliding contact with each other.

Figure 10A:
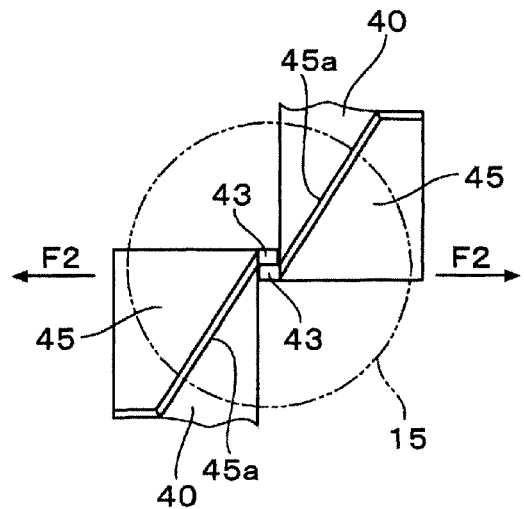

As this occurs, the driving force F1 (refer to FIG. 6) for driving the pin 10 is converted into a driving force which drives the abutment pieces 45 widthwise outwards by the abutment portions 45a of the abutment pieces 45. To describe this in greater detail by reference to FIGS. 6 and 10A to 10C, as shown in FIG. 6, the abutment pieces 45, 45 of the plate spring member 30 which are bent at a predetermined angle strike against an outer circumference of the conical distal end portion 15 of the pin 10. Then, when the pin 10 is driven further, the conical distal end portion 15 are driven between the abutment portions 45a provided on the abutment pieces 45 as the sloping surfaces while brought into sliding contact therewith, whereby the driving force F1 is converted into driving forces F2, F2 which drive the abutment pieces 45 widthwise outwards, as shown in FIG. 10A.

Figure 10B:
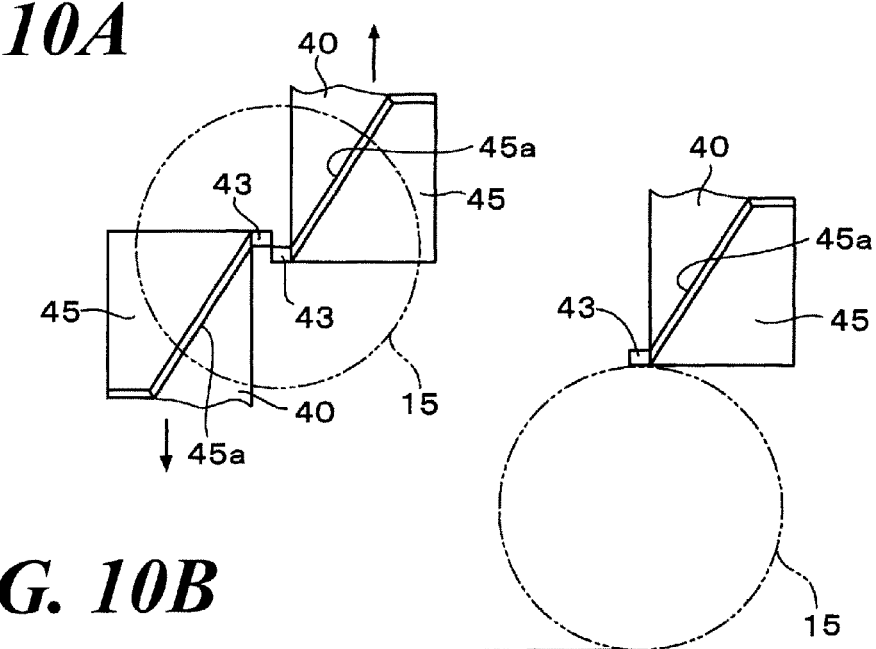
Figure 10C:
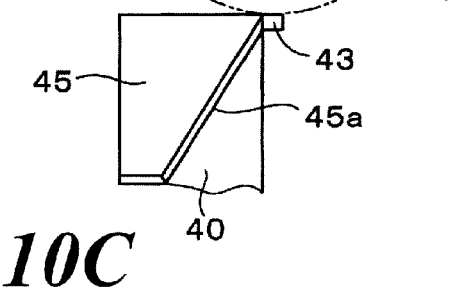

As a result, as shown in FIG. 10B, the engagement between the engagement projecting pieces 43, 43 is released, whereby the engagement projecting pieces 43, 43 are expanded by the elastic restoring force (refer to arrows in the figure) itself. Then, as shown in FIG. 10B, the pin 10 enters between the elastic engagement pieces 35, 35.

As a result, as shown in FIG. 8A, the respective engagement shoulders 37, 37 of the elastic engagement pieces 35 are brought into engagement with the circumferential edge of the rear side of the mounting hole 3 in the mount-base member 2, and the base portion 51 of the grommet 50 is brought into the circumferential edge of the front side of the mounting hole 5 in the mounting-subject member 4, whereby the mount-base member 2 and the mounting-subject member 4 are held by the engagement shoulders 37, 37 and the base portion 51, thereby mounting the mounting-subject member 4 on the mount-base member 2. As this occurs, since the shaft portion 13 of the pin 10 is disposed between the pair of elastic engagement pieces 35, 35, the elastic engagement pieces 35, 35 are restricted from being deflected inwards, whereby the disengagement of the plate spring member 30 from the mounting hole 3 is prevented.

In this embodiment, by driving the shaft portion 13 of the pin 10 towards the bent portions 40 of the elastic engagement pieces 35, as described above, the distal end portion 15 is brought into abutment with the abutment pieces 45 of the folded portions 40 to thereby apply the driving force to the abutment pieces 45 of the folded portions 40. Then, the driving force is converted into the driving forces which drives the abutment pieces 45 widthwise outwards by the abutment portions 45a, whereby the pair of elastic engagement pieces 35, 35 can be offset widthwise from each other so as to release the engagement therebetween. Therefore, the engagement of the pair of elastic engagement pieces 35, 35 in the closed state can be released smoothly by the simple operation of driving the pin 10, thereby enhancing the workability in mounting the fastener 1.

When the pin 10 is driven into the grommet 50, the pressing surfaces 27 provided on the shaft portion 13 are brought into abutment with the projecting portions 58 of the guide pieces 57, whereby both the leg portions 55, 55 are forced to be expanded from inside, thereby further enhancing the disengagement prevention force.

In this embodiment, the constricted portion 19 is formed in the shaft portion 13 of the pin 10 in which the folded portions 40 of the plate spring member 30 fit when the head portion 11 of the pin 10 is pushed in until the head portion 11 is brought into engagement with the circumferential edge of the insertion hole 31 in the plate spring member 30. Namely, since the folded portions 40 are allowed to fit in the constricted portion 19, as shown in FIG. 8A, by bent corner portions of the flexed portions 40 being brought into engagement with the reversely tapered surface 19a and the abutment pieces 45 of the folded portions 40 being brought into engagement with the tapered surface 19b in such a state that the fastener 1 is fixed in the mounting holes, the disengagement of the pin 10 from the plate spring member 30 can be surely prevented.

Since the pair of elastic engagement pieces 35, 35 of the plate spring member 30 which makes up the fastener 1 are expanded in their free state and are brought into engagement with the circumferential edge of the back side of the mounting hole by their restoring force, even in the event that the thickness of the mount-base member 2 in which the mounting hole 3 is formed changes or the inside diameter of the mounting hole 3 is larger or smaller than its standard dimension, the pair of elastic engagement pieces 35, 35 are flexible enough to be opened or closed elastically so as to expand or reduce a space therebetween to maintain the engagement shoulder portions 37, 37 in such a state that the engagement shoulder portions 37, 37 are surely kept in press contact with the circumferential edge of the back side of the mounting hole 3 for engagement, as a result, the fastener 1 can be fixed firmly in the mounting hole 3 without any looseness.

In this embodiment, the respective abutment portions 45a of the abutment pieces 45 are formed into the sloping inner sides and the distal end portion 15 of the shaft portion 13 of the pin 10 is formed into the tapered shape (here, the conical shape). Because of this, when the pin 10 is driven into the plate spring member 30 from the insertion hole 31 therein with the pair of elastic engagement pieces 35, 35 inserted in the mounting holes 3, 5, since the conical distal end portion 15 slides along the abutment portions 45a configured as the sloping surfaces while in contact therewith, the driving force F1 driving the pin 10 (refer to FIG. 6) can be converted into the driving forces F2 which drive the abutment pieces 45 widthwise outwards (refer to FIG. 10A) with good efficiency, whereby the releasing work of the engagement between the pair of elastic engagement pieces 35, 35 can be performed quickly.

Figure 9A:
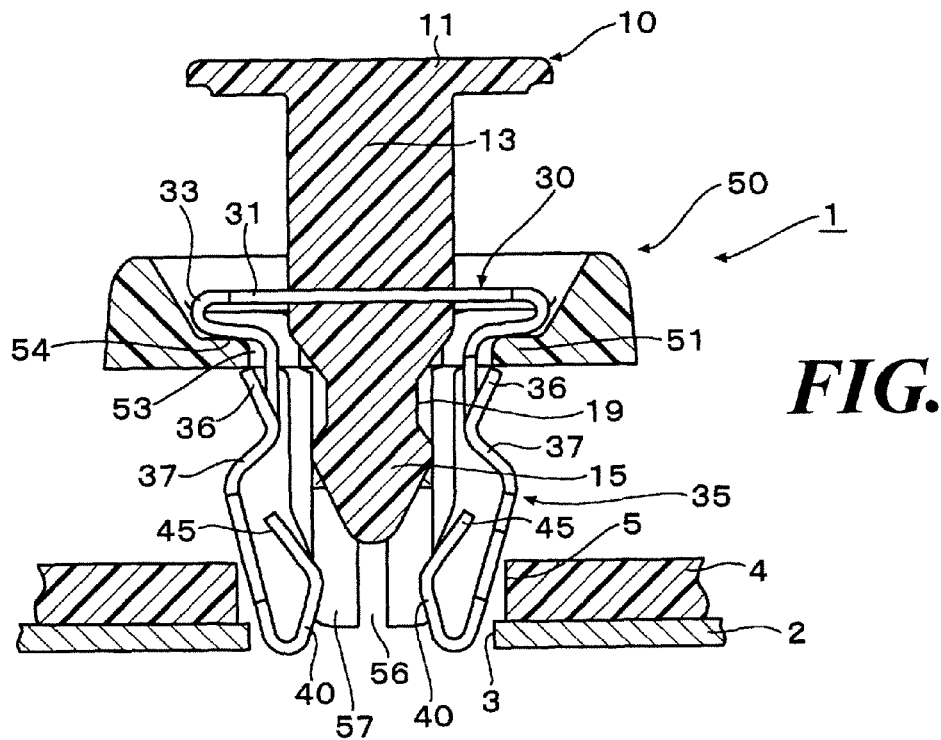
FIG. 9A is an explanatory diagram showing a state in which the fastener is removed from the mounting holes with the other members than the plate spring member shown in section.
Figure 9B:
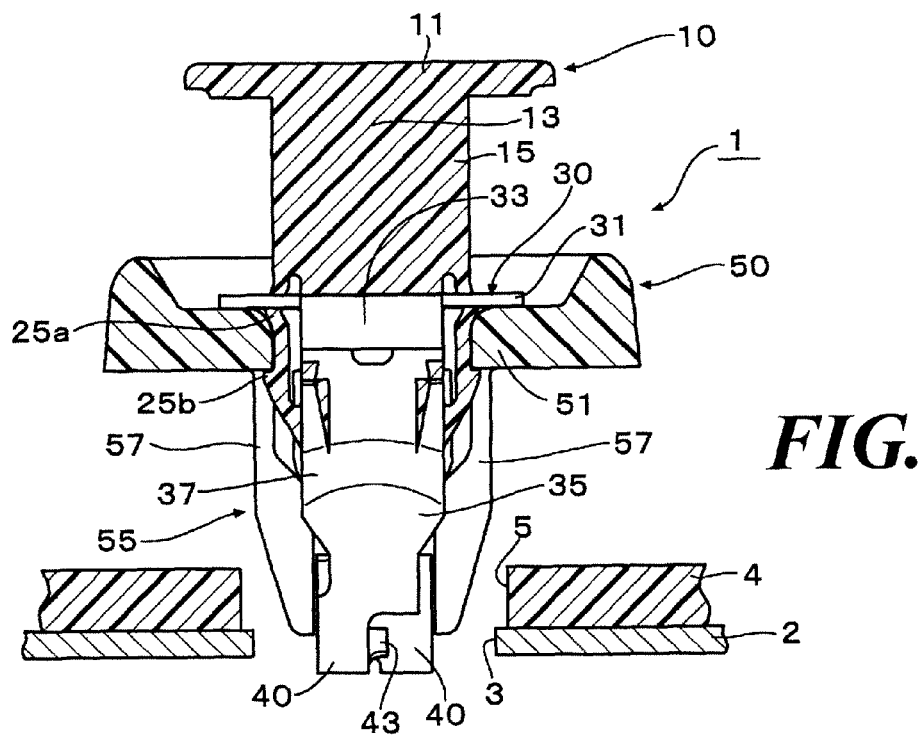
FIG. 9B is an explanatory diagram showing the same state as viewed in a different direction from FIG. 9B.

When removing the mounting-subject member 4 from the mount-base member 2, as shown in FIGS. 8A, 8B, a distal end of a tool such as a screwdriver with a flattened tip is inserted into between the annular wall 52 of the grommet 50 and the head portion 11 of the pin 10 to prize an outer circumferential edge of the head portion 11 to lift up the pin 10 so as to remove the folded portions 40 of the plate spring member 30 from the constricted portion 19 in the pin 10 (refer to FIG. 9A). Then, the pair of elastic engagement pieces 35, 35 become expandable/contractible again, and thereafter, by lifting up the pin 10, the fastener 1 can be removed so that the mounting-subject member 4 can be removed from the mount-base member 2 (refer to FIGS. 9A, 9B).

Although the fastener 1 of the embodiment is made up of the pin 1, the plate spring member 30 and the grommet 50, the fastener 1 may be made up of the pin 10 and the plate spring member 30. As this occurs, the U-shaped bent portions 33 of the plate spring member 30 are brought into direct abutment with the circumferential edge of the mounting hole in the mounting-subject member.

FIGS. 11 to 18 show another embodiment of a fastener of the invention. Like reference numerals will be given to portions which are substantially like to those described in the embodiment above and the description thereof will be omitted herein.

Figure 11:
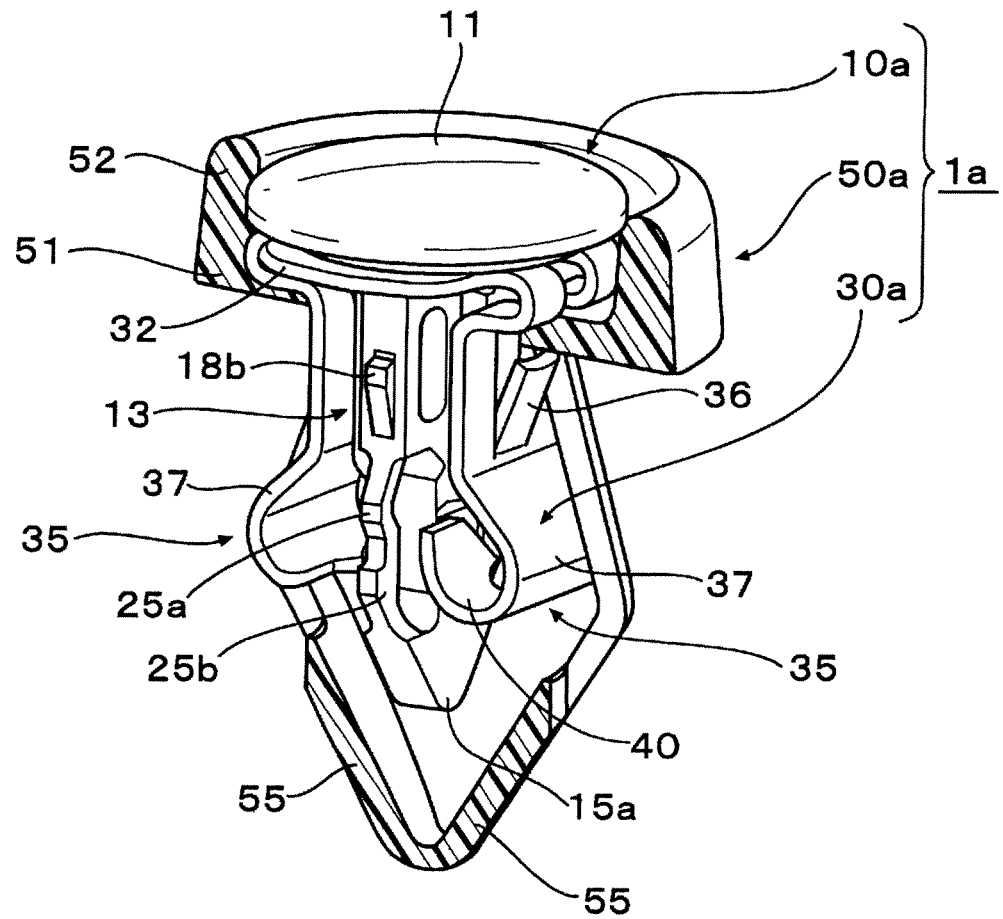
FIG. 11 A perspective view showing another embodiment of a fastener of the invention.

As shown in FIG. 11, a fastener 1a of this embodiment has a pin 10a, a plate spring member 30a and a grommet 50a as with the embodiment above. Hereinafter, the members 10a, 30a, 50a will be described mainly on portions thereof which differ from the corresponding members 10, 30, 50 of the embodiment above.

The plate spring member 30a shown in FIGS. 12A to 13B has a base portion 31 in which a slit-like insertion hole 31a is formed. A pair of notches 31b, 31b are formed in a direction which is at right angles to the forming direction of the insertion hole 31a. A pair of narrow portions 31c, 31c are formed in an outer circumference of the insertion hole 31a in the base portion 31 so as to be situated between a pair of elastic engagement pieces 35, 35 and in positions which face each other.

Figure 13A:
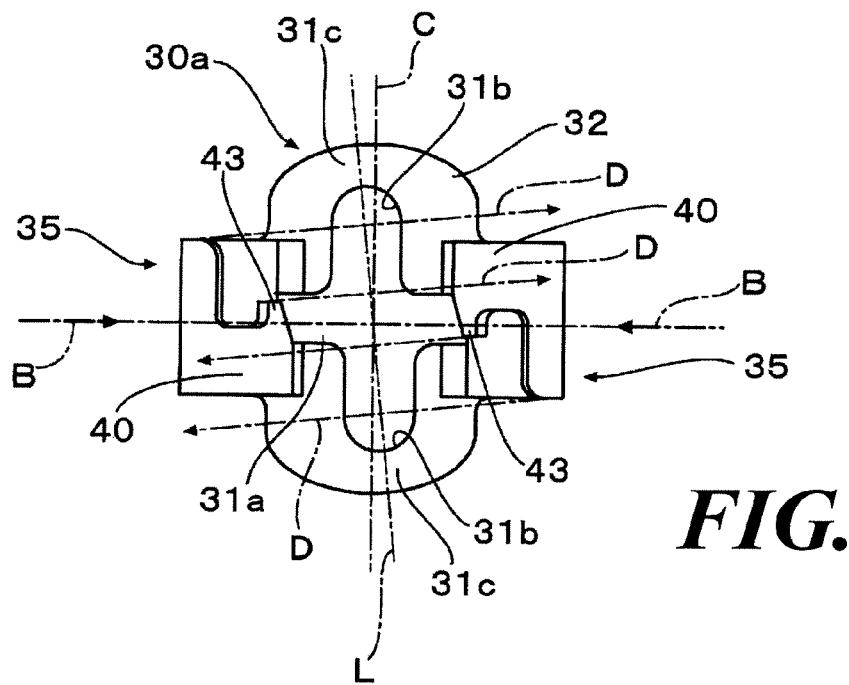
FIG. 13A is a bottom view showing a state in which the elastic engagement pieces of the plate spring member are opened.

As shown in FIG. 13A, the narrow portions 31c, 31c are disposed at both end portions of a direction (refer to a line C) which intersects a deflecting direction (refer to arrows B) of the pair of elastic engagement pieces 35, 35 of the base portion 31 at right angles. When the base portion 31 is viewed in an axial direction, the narrow portions 31c, 31c are formed in positions which are eccentric towards widthwise portions of the elastic engagement pieces 35, 35 where folded portions 40 are not formed. Namely, in the figure, the upper narrow portion 31c is formed in the position which is eccentric towards the widthwise portion of the left-hand side elastic engagement piece 35 where no folded portion 40 is formed, while the lower narrow portion 31c is formed eccentric towards the widthwise portion of the right-hand side elastic engagement piece 35 where no folded portion is formed.

The insertion hole 31a passes through a widthwise center of U-shaped bent portions 33 to extends as far as just before engagement shoulder portions 37, whereby proximal portions of the elastic engagement pieces 35 are cut out. Disengagement prevention claws 36 are formed in a widthwise center of the proximal portions of the elastic engagement pieces 35 via the cutout portions so as to rise obliquely outwards.

Figure 12A:
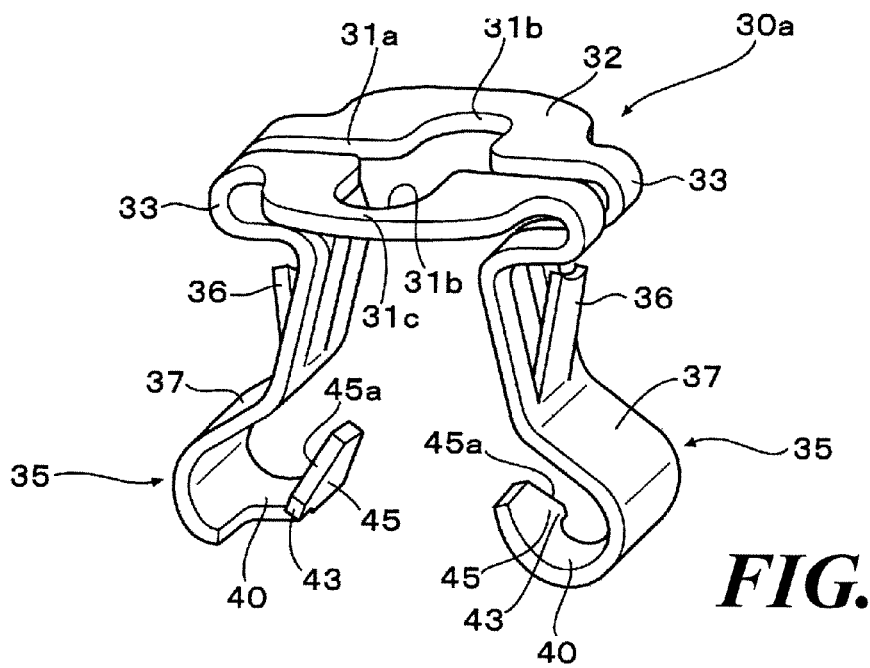
FIG. 12A is a perspective view showing a state in which elastic engagement pieces of a plate spring member which makes up the fastener are opened.
Figure 12B:
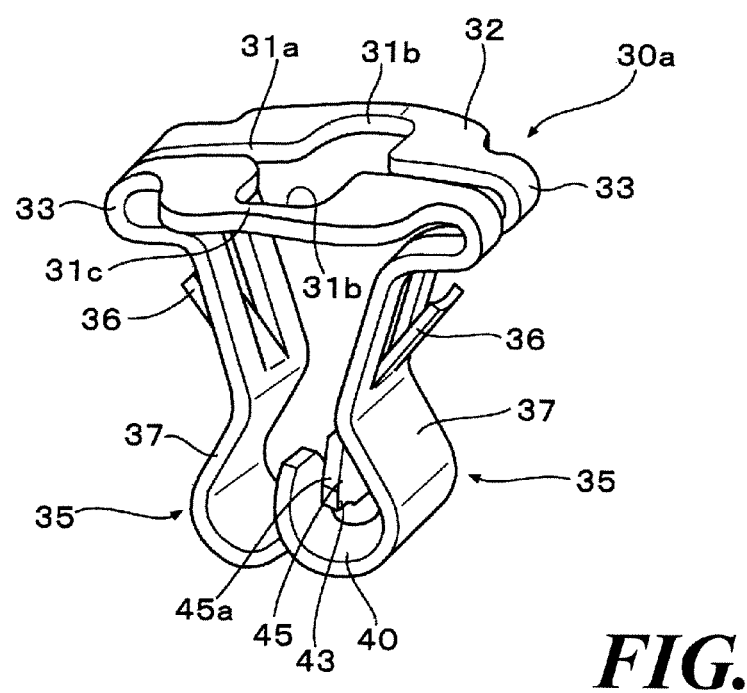
FIG. 12B is a perspective view showing a state in which the elastic engagement pieces of the plate spring member are closed.
Figure 15:
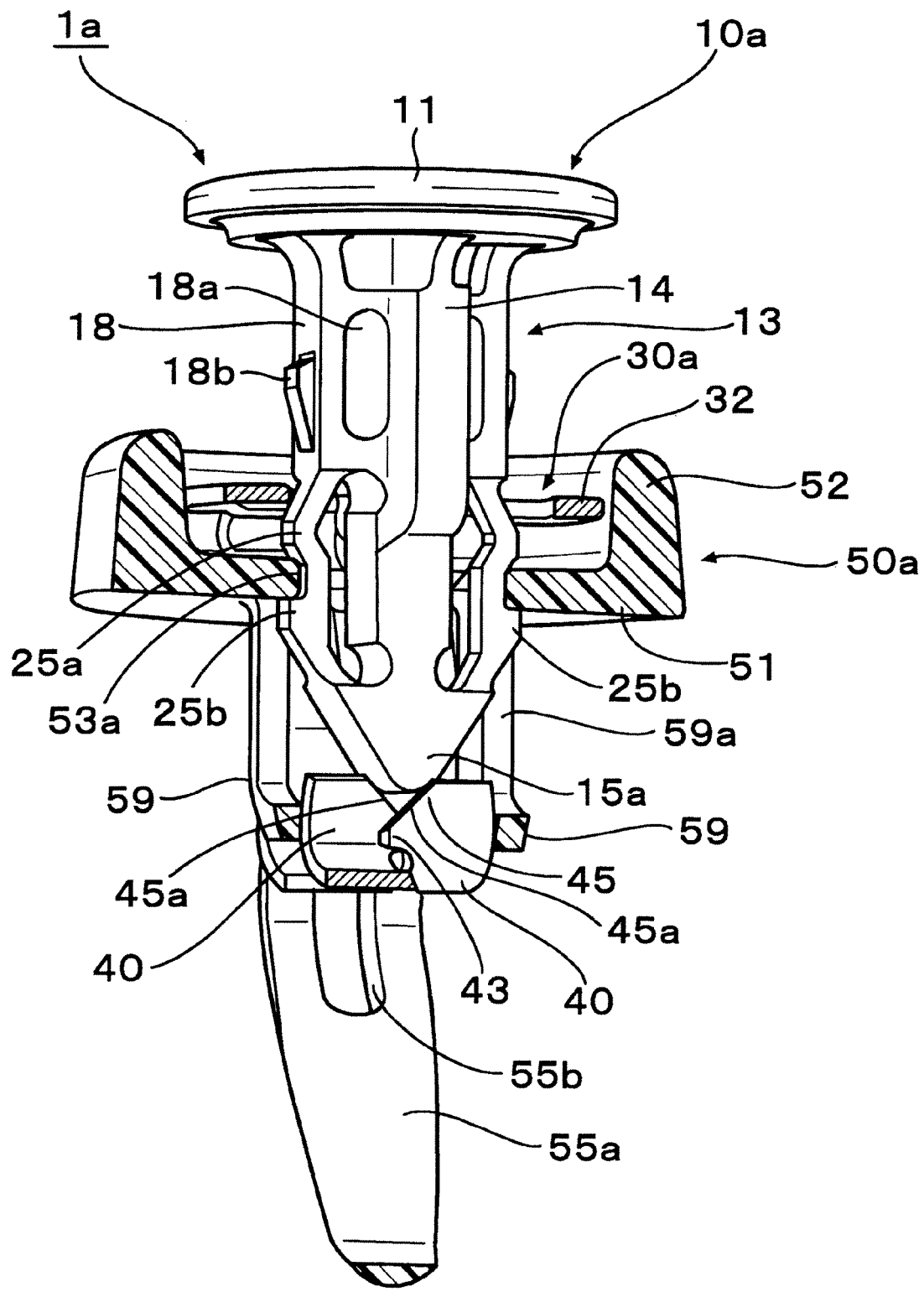
FIG. 15 A perspective view showing a state in which the plate spring member with the elastic engagement pieces closed and the pin are assembled into the grommet.

Triangular plate-shaped projecting pieces are provided on inner sides of the folded portions 40, 40 formed at respective distal end portions of the elastic engagement pieces 35 which lie adjacent widthwise to each other so as to project towards the other adjacent folded portion 40 (refer to FIGS. 12B, 13A, 15). A side of the projecting piece which lies to face a proximal portion of the plate spring member 30a is formed into an abutment piece 45 with which a distal end portion 15a (which will be described later) of the pin 10a is brought into abutment to thereby apply a driving force, while a side of the projecting piece which lies to face a distal end portion is formed into an engagement projecting piece 43 which holds the elastic engagement pieces in a closed state.

Figure 14A:
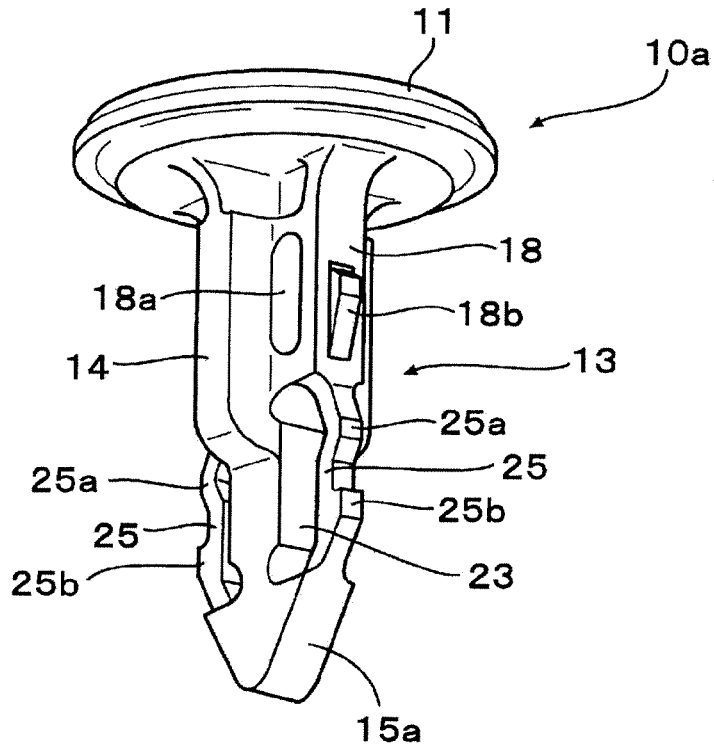
FIG. 14A is a perspective view of a pin which makes up the fastener.

In the pin 10a shown in FIG. 14A, plate-shaped expanded portions 14 are disposed at a proximal portion of the shaft portion 13 which are wider than the distal end portion of the shaft portion 13. The expanded portions 14 extend towards a distal end of the shaft portion a length which enables the expanded portions 14 to be brought into abutment with portions of the elastic engagement pieces 35, 35 which lie closer to proximal portions than engagement shoulder portions 37 thereof and which prohibits the expanded portions 14 from being brought into abutment with portions of the elastic engagement pieces 35, 35 which lie closer to distal end portions than the engagement shoulder portions 37 thereof when the shaft portion 13 is disposed between the elastic engagement pieces 35, 35 (refer to FIG. 17).

Deflectable wall portions 18, 18 are formed on both side portions of the shaft portion 13 which lie at right angles to the expanded portions 14 so as to be deflected via voids 18a. Fixing projecting portions 18b, 18b are formed on the deflectable wall portions 18 so that a side of the fixing projecting portion which faces the distal end of the shaft portion is tapered and a side which faces the proximal end portion has a stepped portion formed thereon. This fixing projecting portion 18b is designed to be brought into engagement with an inner circumference of an engagement groove 59a in the grommet 50a, which will be described later, at a proximal end portion thereof when the pin 10a is driven into the plate spring member 30a until a head portion 11 is brought into engagement with a circumferential edge of the insertion hole 31a (refer to FIG. 18). Namely, the fixing projecting portion 18 constitutes a fixing portion which fixes the pin in the grommet and has the projecting portion which is brought into engagement with the inner circumference of the engagement groove 59a.

The distal end portion 15a of the shaft portion 13 is formed into a triangular plate-like shape and has a tapered shape in which both sides of the distal end portion 15a become wider gradually towards the head portion 11. Bridge-shaped deflectable pieces 25, 25 are connected to sides of a proximal end of the distal end portion 15a and respective distal ends of the expanded portions 14, 14, and an engagement projecting portion 25a and an engagement claw portion 25b are formed on each deflectable piece 25. The engagement projecting portions 25a and the engagement claw portions 25b are brought into engagement with upper and lower edge portions of the base portion 51 of the grommet 50a when the pin 10a is driven into the grommet 50a (refer to FIG. 15), whereby the pin 10a is temporarily held in a position where the pin 10a does not apply a driving force to the abutment pieces 45. Namely, the engagement projecting portions 25a and the engagement claw portions 25b constitute a temporary holding portion in this embodiment.

Figure 14B:
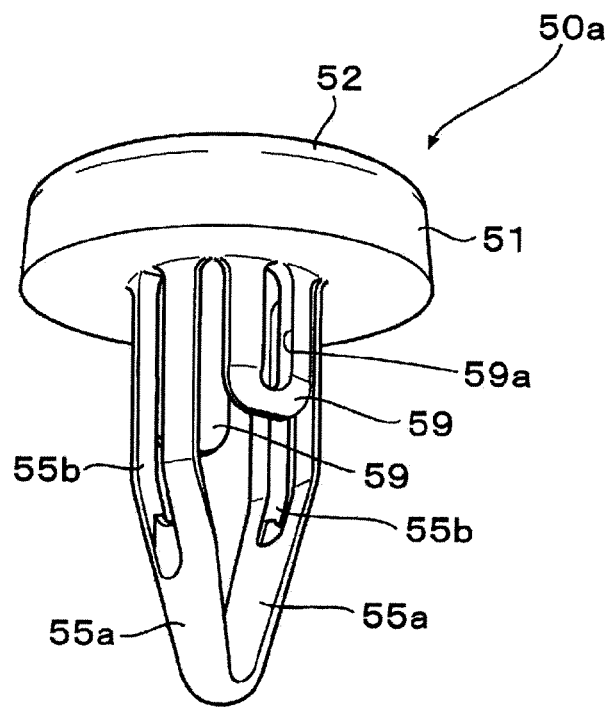
FIG. 14B is a perspective view of a grommet which makes up the fastener.
Figure 16:
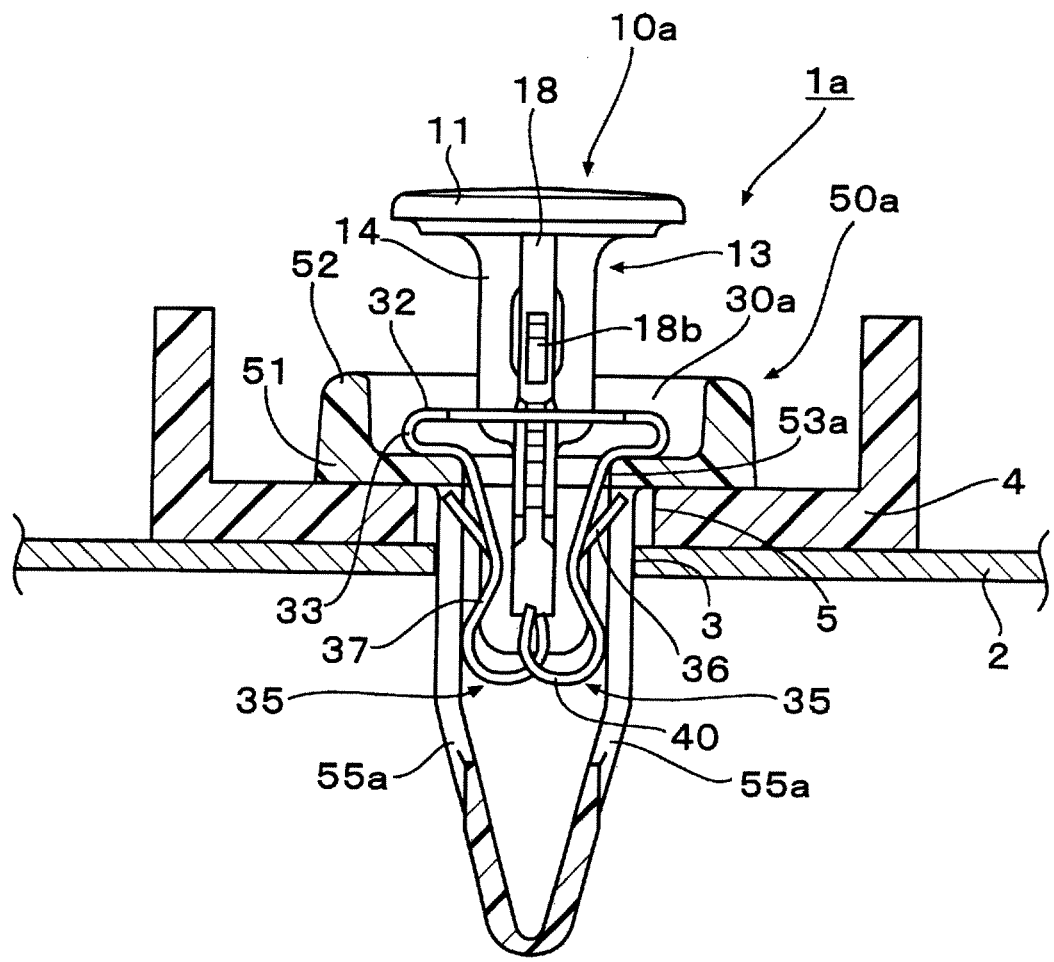
FIG. 16 A sectional explanatory diagram showing a state in which the fastener is inserted into mounting holes.
Figure 17:
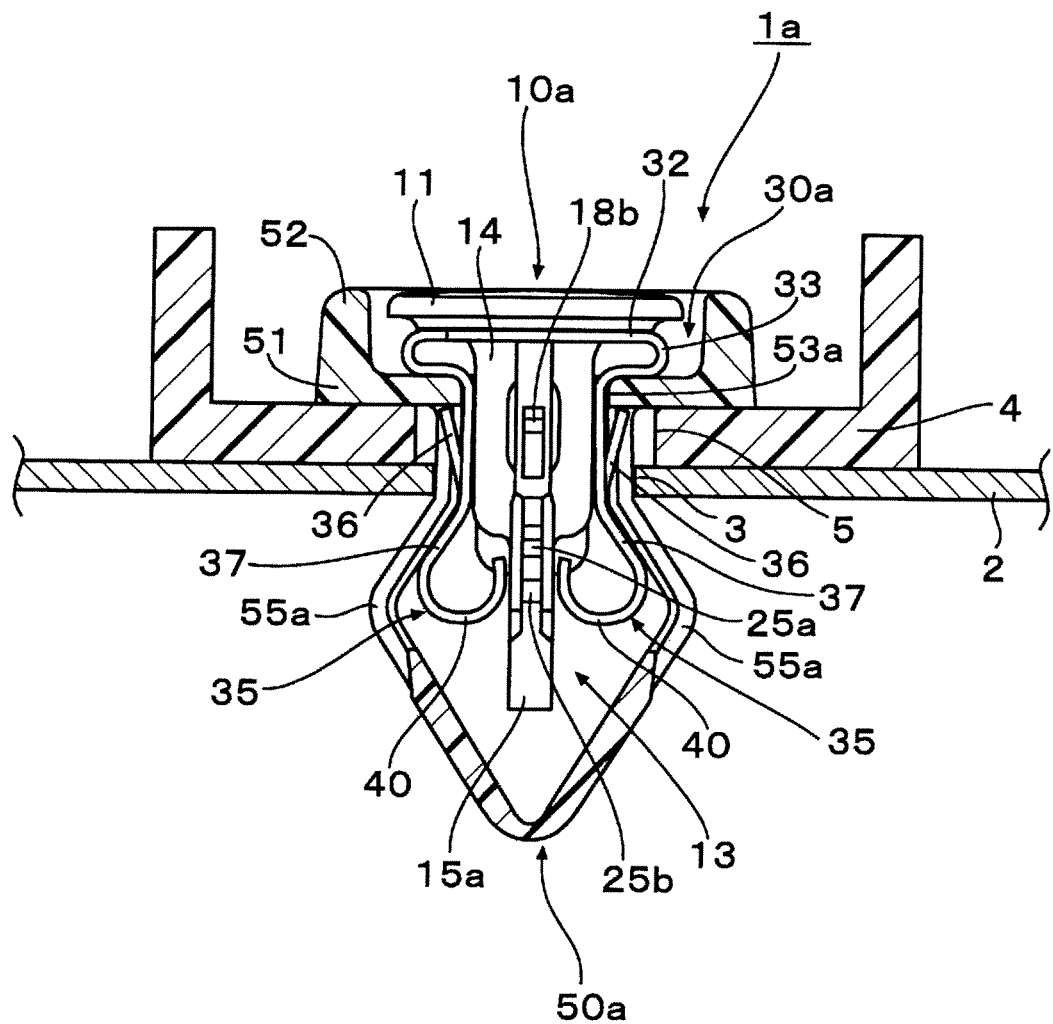
FIG. 17 A sectional explanatory diagram showing a state in which the fastener is fixed in the mounting holes.

In the grommet 50a shown in FIGS. 14A and 14B, a quadrangular inserting opening 53a (refer to FIGS. 15, 16) is formed in a center of the base portion 51, and a pair of leg portions 55a, 55a are provided to extend from both facing side edges of a back side of the insertion opening 53a which are disposed in the deflecting direction of the pair of elastic engagement pieces 35, 35 and outside of the same elastic engagement pieces 35, 35 (refer to FIGS. 11, 16, 17). The leg portions 55a, 55a are connected to each other at distal ends thereof into a shape which tapers towards the distal ends (here, into a substantially V-shape). An elongated groove 55b is formed in a widthwise center of each leg portion 55a so as to extend in the extending direction of the leg portion 55a. This elongated groove 55b facilitates the deflection of the leg portion 55a when the leg portion 55a is pressed from inside by the elastic engagement piece 35 and constitutes a portion which a disengagement prevention claw 36 enters when the plate spring member 30a is held in the grommet 50a.

A pair of guide leg portions 59, 59 are provided to extend from both side edges of the insertion opening 53a in the base portion 51 which are at right angles to the leg portions 55a, 55a. The guide leg portions 59, 59 are disposed in positions which are at right angles to the deflecting direction of the elastic engagement pieces 35 and which lie between the pair of elastic engagement pieces 35, 35. An engagement groove 59a is formed in each guide leg portion 59 so as to extend in an axial direction thereof (in a direction in which the guide leg portion 59 extends). Then, when the pin 10*a* is driven into the plate spring member 30*a* until the head portion 11 is brought into engagement with a circumferential edge of the insertion hole 31*a*, the pairs of projecting portions (the fixing projecting portions 18*b*, the engagement projecting portions 25*a*) are brought into engagement with inner circumferences of the engagement grooves 59*a* at both end portions thereof (refer to FIG. 18).

Next, a using method of the fastener 1*a* of this embodiment will be described.

Since a basic using method is similar to that of the embodiment described first, characteristic portions will mainly be described. Firstly, the pair of elastic engagement pieces 35, 35 which are spaced apart from each other in their free state (refer to FIG. 12B) in which no external force is applied thereto are pressed inwards to be deflected against their elastic restoring force.

In this embodiment, the narrow portions 31*c*, 31*c* provided in the base portion 31 are disposed at both the side portions of the base portion 31 which lie at right angles to the deflecting direction of the elastic engagement pieces 35, and when the base portion 31 is viewed in the axial direction, the narrow portions 31*c*, 31*c* are formed in the positions which are eccentric towards the widthwise portions of the elastic engagement pieces 35, 35 where the folded portions 40 are not formed (refer to FIG. 13A). Because of this, when the pair of elastic engagement pieces 35, are deflected inwards, the base portion 31 is bent about a line L in FIG. 13A, and the one engagement projecting piece 43 and the other engagement projecting piece 43 move so as to approach each other widthwise as is indicated by arrows D.

Figure 13B:
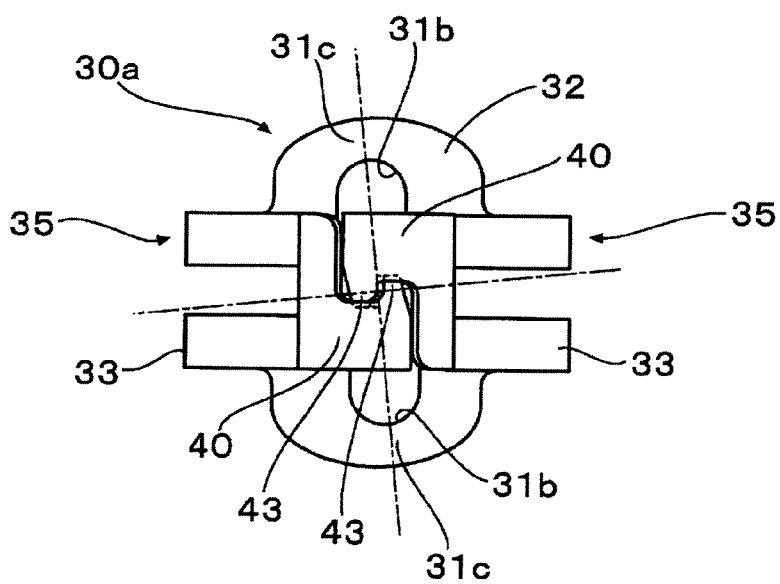
FIG. 13B is a bottom view showing a state in which the elastic engagement pieces of the plate spring member are closed.

As a result, although the pair of engagement projecting pieces 43 would otherwise be caused to approach each other to thereby be superposed on each other, the engagement projecting pieces 43 are brought into engagement with each other while being expanded widthwise, and therefore, even in the engaged state shown in FIG. 13B, a biasing force is produced by which the engagement projecting pieces 43 are caused to approach each other widthwise, whereby the engagement projecting pieces 43 are brought into engagement with each other while pressing against each other widthwise. Thus, the engagement of the engagement biasing pieces 43 is made more difficult to be released, whereby a risk can be eliminated that the engagement between the elastic engagement pieces 35, 35 is released during transportation.

Thereafter, the pair of elastic engagement pieces 35, 35 are aligned with the pair of leg portions 55*a*, 55*a* of the grommet 50*a* and the plate spring member 30*a* is driven into the inserting opening 53*a* in the grommet 50, whereby the pair of disengagement prevention claws 36, 36 enter the elongated grooves 55*b*, 55*b* of the corresponding leg portions 55*a* and the disengagement prevention claws 36, 36 are brought into engagement with the circumferential edge of the back side of the insertion opening 53*a* (refer to FIG. 16), whereby the plate spring member 30*a* can be held in the grommet 50*a*.

Next, the pin 10*a* is driven into the plate spring member 30*a* to a predetermined depth with the plate-shaped expanded portions 14 of the pin 10*a* aligned with both the sides of the slit-shaped insertion hole 31*a* in the plate spring member 30*a* and the pair of deflectable wall portions 18, 18 of the pin 10*a* aligned with the pair of notches 31*b*, 31*b* in the plate spring member 30*a*, whereby as shown in FIG. 15, the engagement projecting portions 25*a* and the engagement claw portions 25*b* are brought into engagement with the upper and lower edge portions of the base portion 51, and the pin 10*a* is held in the grommet 50*a* while being prevented from being disengaged therefrom. In this state, the tapered sides of the distal end portion 15*a* of the pin 10*a* are brought into engagement with the abutment portions 45*a*, 45*a* of the abutment pieces 45.

In this embodiment, the temporary holding portion (the engagement projecting portions 25*a* and the engagement claw portions 25*b*) and the fixing portion (the fixing projecting portions 18*b*) are provided on the shaft portion 13 of the pin 10*a*, whereby the pin alone can be temporarily held in the grommet 50*a*. Therefore, the necessity can be obviated of providing a construction to prevent the disengagement of the pin 10*a* on the plate spring member 30*a*, the rigidity, spring properties and elastic restoring force of the plate spring member 30*a* can be ensured strongly.

Thereafter, the assembled fastener 1 is inserted into the mounting holes 5, 3 of the mounting-subject member 4 and the mount-base member 2, respectively.

In this embodiment, as this occurs, since the leg portions 50*a* which are connected together at the distal ends thereof and the guide leg portions 59 constitute guides, the grommet 50*a* can be inserted smoothly without being caught at the mounting holes 5, 3.

Then, after the base portion 51 is brought into abutment with the circumferential edge of the front side of the mounting hole 5, the pin 10*a* is driven into the grommet 50*a*. Then, the engagement of the abutment pieces 45, 45 is released by the triangular plate-shaped distal end portion 15*a*, and the pair of elastic engagement pieces 35, 35 are opened, whereby the leg portions 55*a*, 55*a* of the grommet 50*a* are forced to be expanded by the engagement shoulder portions 37, 37 from inside thereof. As a result, the engagement shoulder portions 37, 37 of the elastic engagement pieces 35 are brought into indirect engagement with the circumferential edge of the back side of the mounting hole 3 via the leg portions 55*a*, 55*a*, whereby the mounting-subject member 4 can be mounted on the mounting base 2 via the fastener 1*a* (refer to FIG. 17). In addition, in this embodiment, since the distal end portion 15*a* of the pin 10*a* has the triangular plate shape and is brought into abutment with the abutment portions 45*a*, 45*a* of the abutment pieces 45, 45 at both the sides thereof, the driving force from the pin 10*a* is allowed to be exerted on the abutment portions 45*a*, 45*a* efficiently without being dispersed, thereby smoothly releasing the engagement of the elastic engagement pieces 35, 35.

Figure 18:
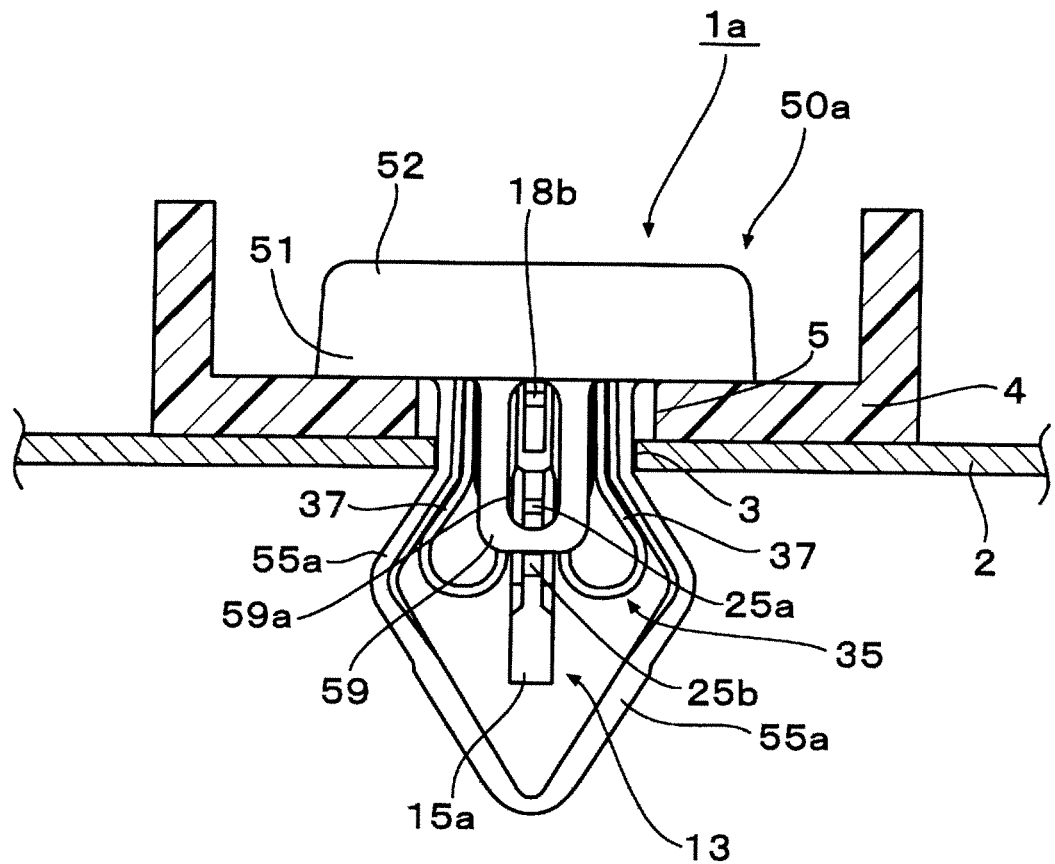
FIG. 18 A sectional explanatory diagram showing a state in which the fastener is fixed in the mounting holes.

When the pin 10*a* is driven into the grommet 50*a* until the head portion 11 of the pin 10*a* is brought into engagement with the circumferential edge of the insertion hole 31*a* in the plate spring member 30, as shown in FIG. 18, the fixing projecting portions 18*b* are brought into engagement with the inner circumferences of the engagement grooves 59*a* at the proximal ends thereof, and the engagement projecting portions 25*a* are brought into engagement with the inner circumferences of the engagement grooves 59*a* at the distal ends thereof. Further, the engagement claw portions 25*b* are brought into engagement with the circumferential edges of distal end faces of the guide leg portions 59, whereby the pin 10*a* is fixed in the grommet 50*a*.

In this embodiment, as described above, when the pin 10*a* is driven into the grommet 50*a* until the head portion 11 of the pin 10*a* is brought into engagement with the circumferential edge of the insertion hole 31*a* in the plate spring member 30*a*, the pairs of projecting portions (the fixing projecting portions 18*b* and the engagement projecting portions 25*a*) formed on the shaft portion 13 of the pin 10*a* are brought into engagement with the inner circumferences of the engagement grooves 59*a* in the guide legs 59, 59 with an appropriate clicking sensation felt. Therefore, it can be grasped more clearly that the pin mounting work in the grommet 50*a* is completed.

In this embodiment, since the leg portions 55*a*, 55*a* of the grommet 50*a* are disposed outwards of the elastic engagement pieces 35, 35, the elastic engagement pieces 35 of the plate spring member 30*a* are not brought into direct engagement with the mounting hole 3 but are brought into indirect engagement with the mounting hole 3 via the leg portions 55*a* (refer to FIG. 17). In this way, since the metal plate spring member 30*a* is prevented from being brought into direct engagement with the mounting hole 3, the generation of rust in the plate spring member 30*a* can be prevented, and the generation of abnormal noise can be suppressed when or after the fastener 1*a* is fixed in the mounting hole 3. In addition, in the case of the member in which the mounting hole 3 is formed being made of a metal, the generation of rust at the circumferential edge of the mounting hole can also be prevented.

In this embodiment, by providing the expanded portions 14 having the shape described above on the shaft portion 13 of the pin 10*a*, when the shaft portion 13 of the pin 10*a* is disposed between the elastic engagement pieces 35, 35, since the expanded portions 14 are brought into engagement with the portions on the elastic engagement pieces 35, 35 which lie closer to the proximal portions thereof than the engagement shoulder portions 37, the elastic engagement pieces 35, 35 can be restricted from being closed inwards at the proximal portions, as a result, the mounting strength of the fastener can be enhanced, and the looseness thereof can be prevented. On the other hand, since the expanded portions 14 are not brought into engagement with the engagement shoulder portions 37 of the elastic engagement pieces 35 and hence, the elastic engagement pieces 35 can be deflected, the fastener can deal with a change in thickness of the member in which the mounting hole is formed more flexibly, thereby surely mounting the fastener without any looseness.

When removing the mounting-subject member 4 from the mount-base member 2, the pin 10*a* is prized to be lifted upwards, and the pairs of the projecting portions 18*b*, 25*a* are released from the engagement with the inner circumferences of the engagement grooves 59*a* in the guide leg portions 59, whereby the expanded portions 14 of the pin 10*a* are removed from between the elastic engagement pieces 35, 35, the pin 10*a* being returned to its temporarily held state shown in FIGS. 15, 16. Then, the expanded portions 14 are disengaged, and the pair of elastic engagement pieces 35, 35 become expandable/contractible again. Therefore, the mounting-subject member 4 can be removed from the mount-base member 2 by removing the fastener 1*a* from the mounting holes 3, 5.

In this embodiment, as this occurs, since the pair of leg portions 55*a*, 55*a* of the grommet 50*a* are connected to each other at the distal ends thereof to thereby be tapered towards the distal ends, when the fastener 1*a* is reinserted into the mounting hole after it has been removed from the mounting hole, the fastener 1*a* can be driven into the mounting hole as it is so as to be fixed therein without closing the pair of elastic engagement pieces 35, 35 to bring the engagement projecting pieces 43 into engagement with each other, thereby enhancing the workability.

DESCRIPTION OF REFERENCE NUMERALS

1, 1*a* fastener; 3, 5 mounting hole; 10 pin; 11 head portion; 13 shaft portion; 15 distal end portion; 30, 30*a* plate spring member; 31 base portion; 31*a* insertion hole; 31*b* notch; 31*c* narrow portion; 35 elastic engagement piece; 36 disengagement prevention claw; 37 engagement shoulder portion; 40 folded portion; 43 engagement projecting piece; 45 abutment piece; 45*a* abutment portion; 50, 50*a* grommet; 51 base portion; 53, 53*a* insertion opening; 55, 55*a* leg portion; 56 slit; 59 guide leg portion; 50*a* engagement groove.

The invention claimed is:

1. A fastener comprising:
a pin including a head portion and a shaft portion extended from the head portion; and
a metal plate spring member which receives the pin and adapted to be disposed in a mounting hole, the plate spring member including:
a base portion adapted to be brought into an engagement with a front side of the mounting hole and including an insertion hole through which the pin is inserted; and
a pair of elastic engagement pieces extended from the base portion and adapted to be engageable with each other so as to restrain the pair of elastic engagement pieces against their elastic restoring force in a closed state,
wherein engagement shoulder portions are formed at axially intermediate positions of the pair of elastic engagement pieces so as to engage with a circumferential edge of a back side of the mounting hole when the pair of elastic engagement pieces are disengaged and expanded through the elastic restoring force and to pass through the mounting hole when the pair of elastic engagement pieces are contracted, and
wherein the shaft portion is adapted to disengage the pair of elastic engagement pieces when inserted between the pair of elastic engagement pieces in the closed state and restrict the pair of elastic engagement pieces from contracting inwards by being disposed between the pair of engagement pieces in an opened state.

2. The fastener of claim 1,
wherein respective distal ends of the pair of elastic engagement pieces are folded inwards to constitute folded portions, and the folded portions are offset widthwise from each other,
wherein an engagement projecting piece is formed on one or both inner sides of the folded portions which are adjacent widthwise to each other, and when the elastic engagement pieces are closed, one of the engagement projecting pieces is brought into engagement with the other inner side or the other engagement projecting piece so as to hold the elastic engagement pieces in the closed state,
wherein abutment pieces are formed on the folded portions in positions lying closer to proximal portions thereof than the engagement projecting pieces with which a distal end portion of the pin is brought into abutment to thereby apply a driving force thereto when the pin is inserted with the elastic engagement pieces in the closed state, and abutment portions are formed individually on the abutment pieces which convert the driving force exerted in the inserting direction of the pin into a driving force exerted widthwise outwards of the abutment pieces, and
wherein, when inserted between the elastic engagement pieces in the closed state, the shaft portion of the pin is brought into abutment with the abutment pieces at a distal end portion thereof.

3. The fastener of claim 2,
wherein the respective abutment pieces of the folded portions are folded so that distal end portions thereof approach back surface sides of the elastic engagement pieces,
wherein inner sides of the abutment pieces which lie adjacent widthwise to each other are caused to slope widthwise outwards so that the inner sides extend apart from each other towards distal ends thereof, the sloping inner sides constituting the abutment portions, and
wherein the distal end portion of the shaft portion of the pin has a tapered shape to be brought into abutment with the sloping inner sides of the abutment pieces when the pin is driven.

4. The fastener of claim 3,
wherein a constricted portion is formed in the shaft portion of the pin in which the folded portions of the plate spring member fit when the pin is driven until the head portion of the pin is brought into engagement with a circumferential edge of the insertion hole in the plate spring member.

5. The fastener of claim 3,
wherein, in the base portion of the plate spring member, a pair of narrow portions are formed on an outer circumference of the insertion hole between the pair of elastic engagement pieces to face each other, so that the base portion is bendable at the pair of narrow portions to deflect the pair of elastic engagement pieces.

6. The fastener of claim 3,
wherein expanded portions are formed on the shaft portion of the pin which are brought into abutment with portions of the pair of elastic engagement pieces which lie closer to proximal portions than the engagement shoulder portions but are not brought into abutment with portions which lie closer to distal ends than the engagement shoulder portions when the shaft portion of the pin is disposed between the pair of elastic engagement pieces.

7. The fastener of claim 2,
wherein a constricted portion is formed in the shaft portion of the pin in which the folded portions of the plate spring member fit when the pin is driven until the head portion of the pin is brought into engagement with a circumferential edge of the insertion, hole in the plate spring member.

8. The fastener of claim 7,
wherein, in the base portion of the plate spring member, a pair of narrow portions are formed on an outer circumference of the insertion hole between the pair of elastic engagement pieces to face each other, so that the base portion is bendable at the pair of narrow portions to deflect the pair of elastic engagement pieces.

9. The fastener of claim 2,
wherein, in the base portion of the plate spring member, a pair of narrow portions are formed on an outer circumference of the insertion hole between the pair of elastic engagement pieces to face each other, so that the base portion is bendable at the pair of narrow portions to deflect the pair of elastic engagement pieces.

10. The fastener of claim 2,
wherein expanded portions are formed on the shaft portion of the pin which are brought into abutment with portions of the pair of elastic engagement pieces which lie closer to proximal portions than the engagement shoulder portions but are not brought into abutment with portions which lie closer to distal ends than the engagement shoulder portions when the shaft portion of the pin is disposed between the pair of elastic engagement pieces.

11. The fastener of claim 1, wherein, in the base portion of the plate spring member, a pair of narrow portions are formed on an outer circumference of the insertion hole between the pair of elastic engagement pieces to face each other, so that the base portion is bendable at the pair of narrow portions to deflect the pair of elastic engagement pieces.

12. The fastener of claim 11,
wherein the narrow portions formed in the base portion of the plate spring member are disposed at both side portions of the base portion which lie at right angles to the deflecting direction of the pair of elastic engagement pieces in positions which lie eccentric towards widthwise portions of the elastic engagement pieces where the folded portions are not formed when the base portion is viewed in an axial direction.

13. The fastener of claim 1,
wherein expanded portions are formed on the shaft portion of the pin which are brought into abutment with portions of the pair of elastic engagement pieces which lie closer to proximal portions than the engagement shoulder portions but are not brought into abutment with portions which lie closer to distal ends than the engagement shoulder portions when the shaft portion of the pin is disposed between the pair of elastic engagement pieces.

14. The fastener of claim 1, further comprising a grommet in addition to the pin and the plate spring member,
wherein the grommet has a base portion adapted to be brought into engagement with a circumferential edge of the front side of the mounting hole and a leg portion which extends from a back surface side of the base portion,
wherein an insertion opening is provided in the base portion through which the pair of elastic engagement pieces of the plate spring member and the shaft portion of the pin are inserted,
wherein a holding unit is provided between the base portion and the shaft portion of the pin which temporarily holds the pin which is inserted into the plate spring member through the insertion hole in a position where no driving force is applied to the abutment pieces,
wherein disengagement prevention claws are provided on the pair of elastic engagement pieces of the plate spring member in positions which lie closer to the proximal portions than the engagement shoulder portions which are brought into engagement with a circumferential edge of a back side of the insertion opening in the base portion, and
wherein, by the disengagement prevention claws being brought into engagement with the circumferential edge of the back side of the insertion opening in the base portion, the plate spring member is held in the grommet, and the pin is temporarily held in the grommet by the holding unit in that state.

15. The fastener of claim 14,
wherein provided on the shaft portion of the pin are a temporary holding portion which temporarily holds the pin in the grommet in a position where no driving force is applied to the abutment pieces of the plate spring member and a fixing portion which fixed fixes the pin in the grommet when the pin is driven until the head portion thereof is brought into engagement with the circumferential edge of the insertion hole in the plate spring member.

16. The fastener of claim 14,
wherein the leg portion of the grommet includes a pair of leg portions which are disposed in a direction which is at right angles to the deflecting direction of the pair of elastic engagement pieces of the plate spring member held in the grommet.

17. The fastener of claim 14,
wherein the leg portion of the grommet includes a pair of leg portions which are disposed in a deflecting direction of the pair of elastic engagement pieces and outside of the pair of elastic engagement pieces.

18. The fastener of claim 17,
wherein the pair of leg portions of the grommet are connected together at distal ends thereof and tapered towards the distal ends.

19. The fastener of claim 17,
wherein a guide leg portion including a engagement groove extending along an axial direction is formed in a position lying at right angles to the pair of leg portions, and
wherein a pair of projecting portions are formed on the shaft portion of the pin which are brought into engagement with an inner circumference of the engagement groove at both end portions when the pin is driven until the head portion of the pin is brought into engagement with the circumferential edge of the insertion hole in the plate spring member.

20. The fastener of claim 1, wherein the plate spring member is formed such that, when the plate spring member is in an undeformed state, a distance between outer surfaces of the engagement shoulder portions is larger than an inside distance of the mounting hole.

\* \* \* \* \*